(12) United States Patent
Sakai et al.

(10) Patent No.: US 8,876,416 B2
(45) Date of Patent: Nov. 4, 2014

(54) SHUTTER APPARATUS AND IMAGE PICKUP APPARATUS

(71) Applicant: Canon Kabushiki Kaisha, Tokyo (JP)

(72) Inventors: Masanori Sakai, Yokohama (JP); Koichi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/200,298

(22) Filed: Mar. 7, 2014

(65) Prior Publication Data

US 2014/0270748 A1 Sep. 18, 2014

(30) Foreign Application Priority Data

Mar. 15, 2013 (JP) .................................. 2013-053323
Mar. 15, 2013 (JP) .................................. 2013-053688

(51) Int. Cl.
*G03B 9/36* (2006.01)
*G03B 19/12* (2006.01)

(52) U.S. Cl.
CPC . *G03B 9/36* (2013.01); *G03B 19/12* (2013.01)
USPC .......................................................... 396/489

(58) Field of Classification Search
CPC .............. G03B 9/08; G03B 9/10; G03B 9/22; G03B 9/36
USPC .......................................................... 396/489
See application file for complete search history.

(56) References Cited

U.S. PATENT DOCUMENTS

2011/0129212 A1* 6/2011 Yamaguchi et al. .......... 396/463

FOREIGN PATENT DOCUMENTS

| JP | 2007-279270 A | 10/2007 |
| JP | 2007-316503 A | 12/2007 |
| JP | 2012-118346 A | 6/2012 |

* cited by examiner

*Primary Examiner* — Wib Perkey
(74) *Attorney, Agent, or Firm* — Fitzpatrick, Cella, Harper & Scinto

(57) ABSTRACT

A shutter apparatus includes a blade member, a blade moving member, a locking member, a cam member, and a restriction member. The cam member moves the locking member from the locking position to the non-locking position so that the blade moving member moves from the closing position to the opening position. The restriction member moves from the non-restriction position to the restriction position after the blade moving member moves from the closing position to the opening position. The cam member moves the locking member in a direction opposite to a direction from the non-locking position to the locking position so that the locking member moves the restriction member from the restriction position to the non-restriction position.

6 Claims, 30 Drawing Sheets

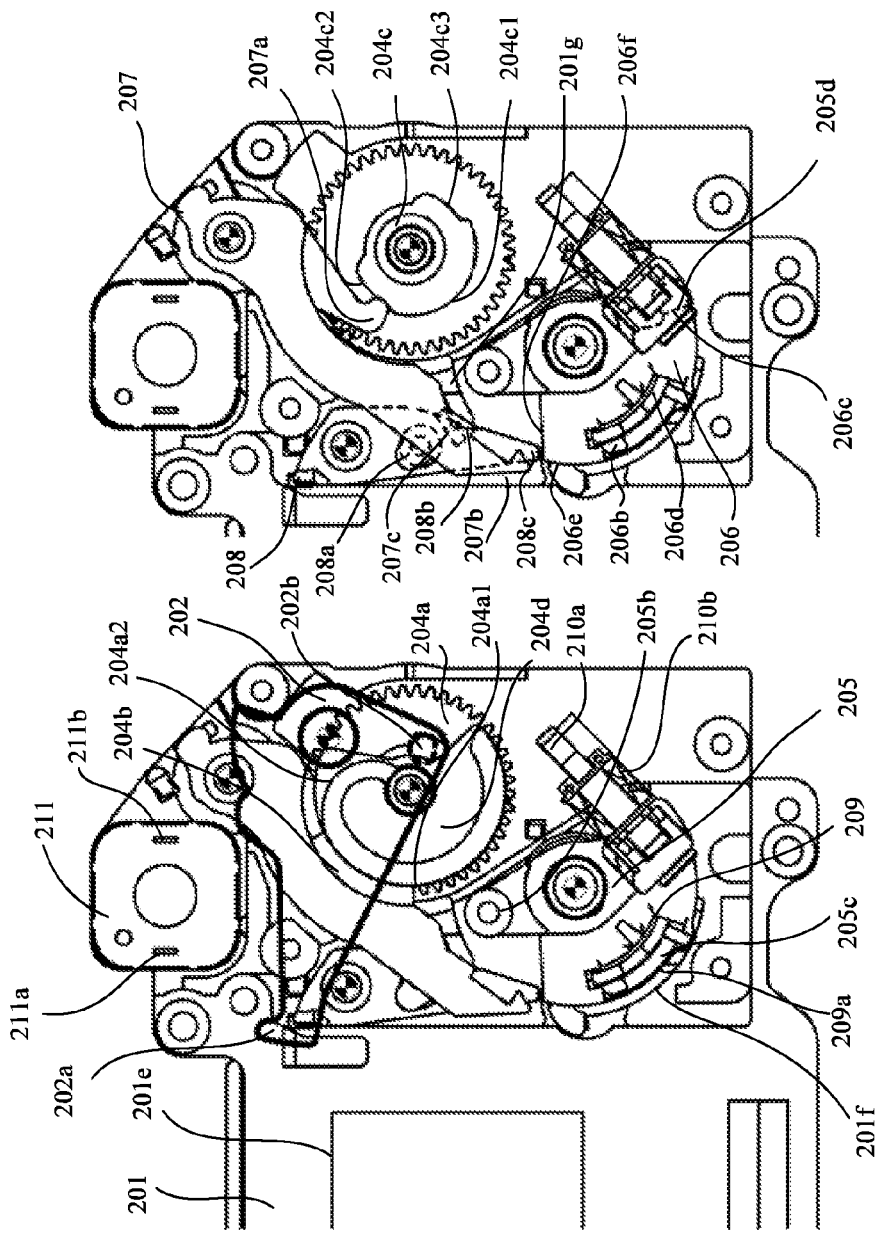

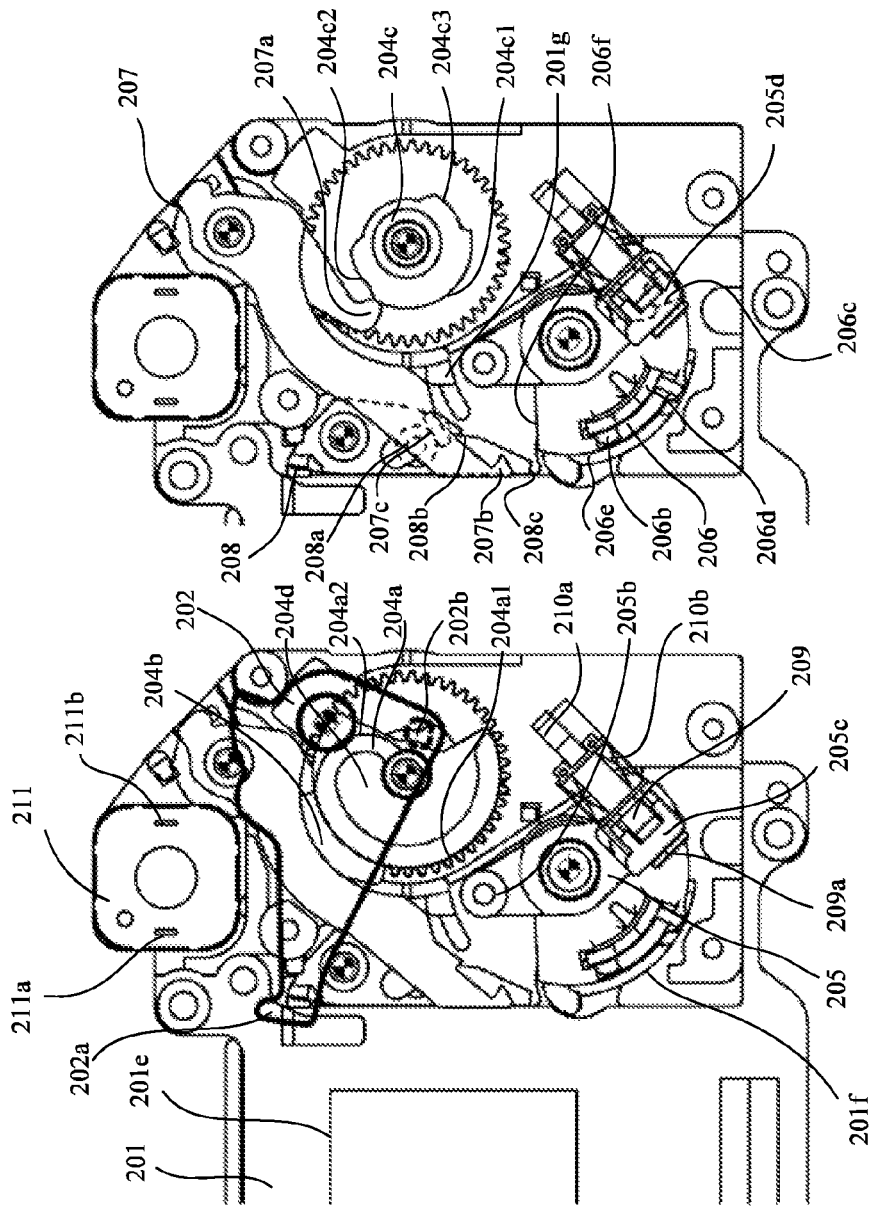

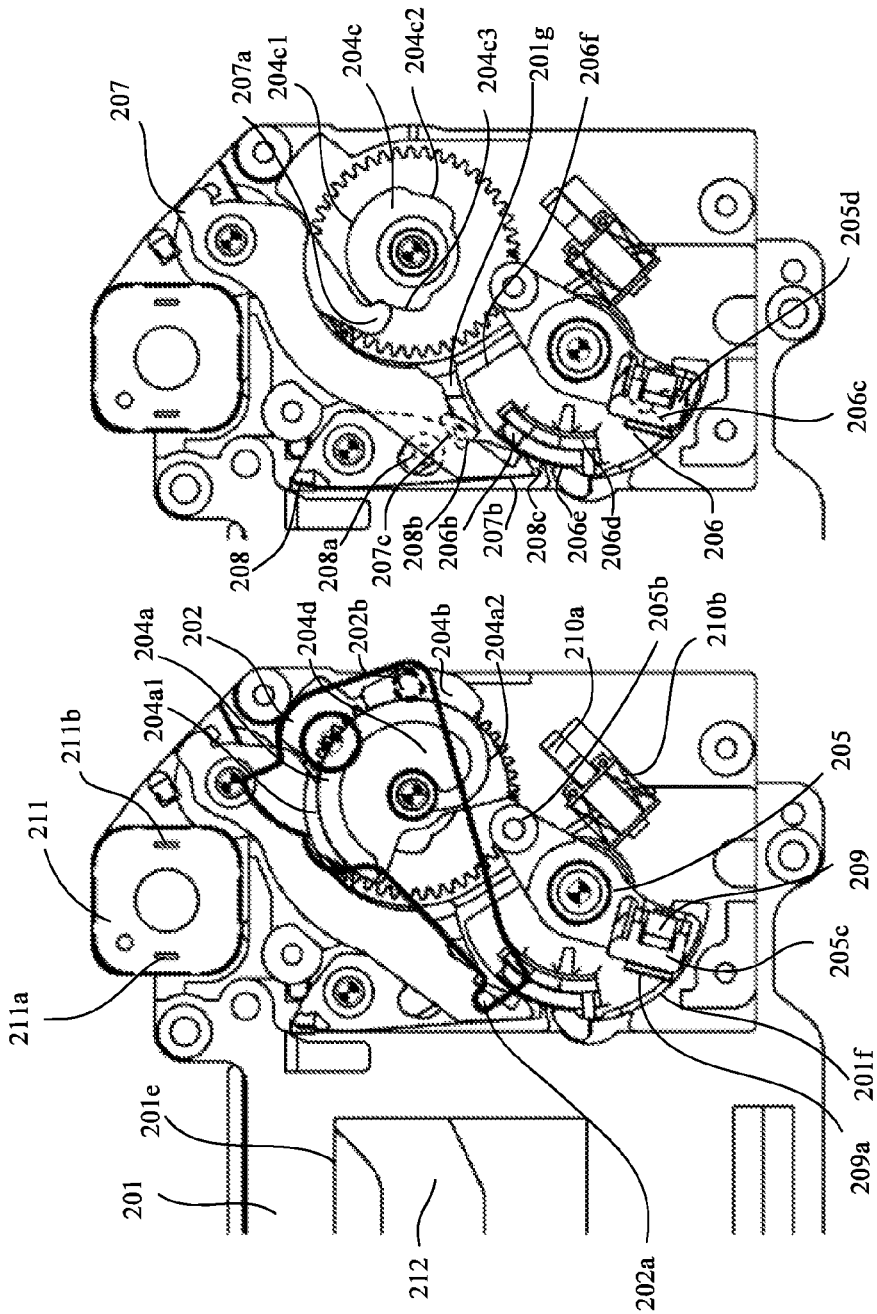

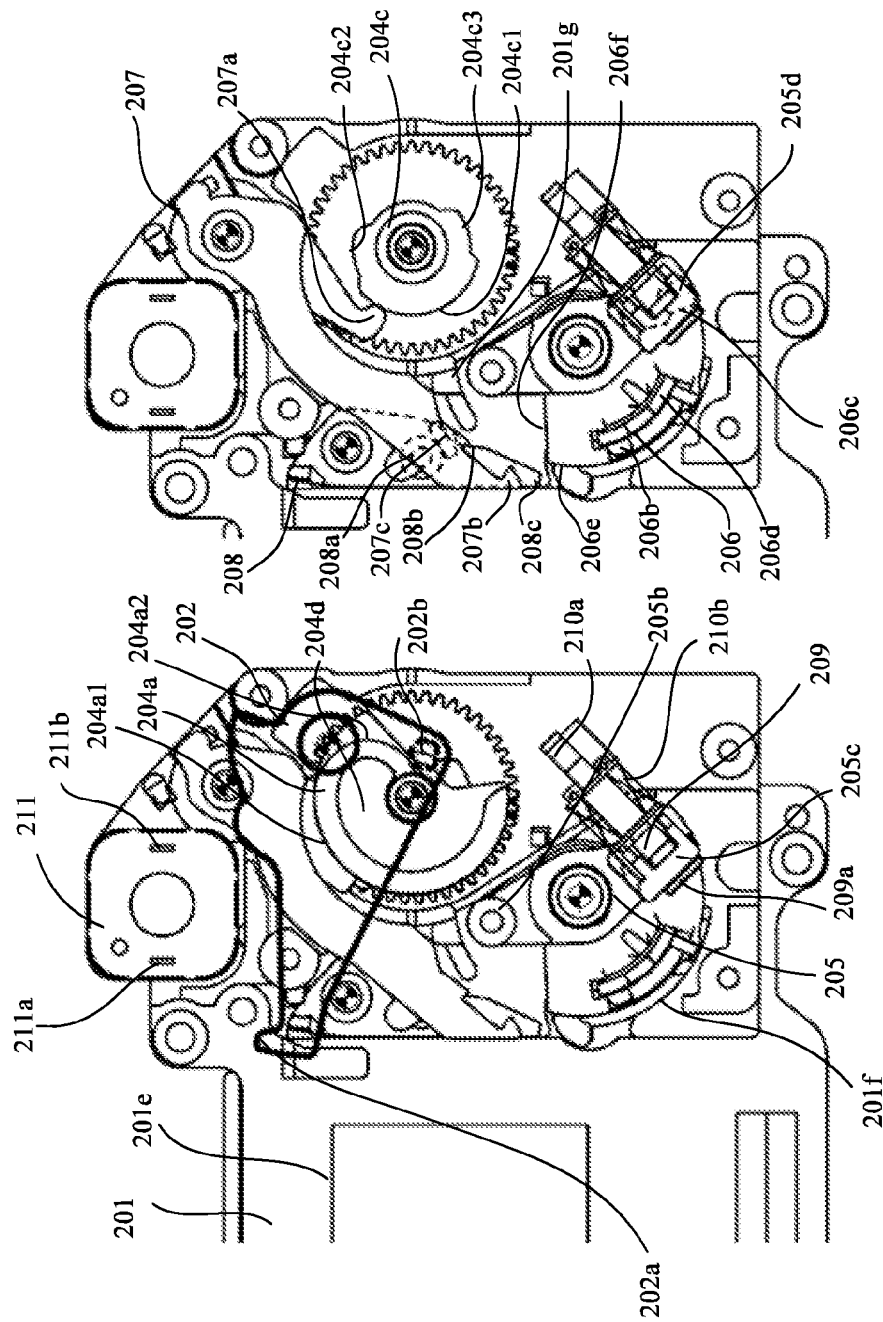

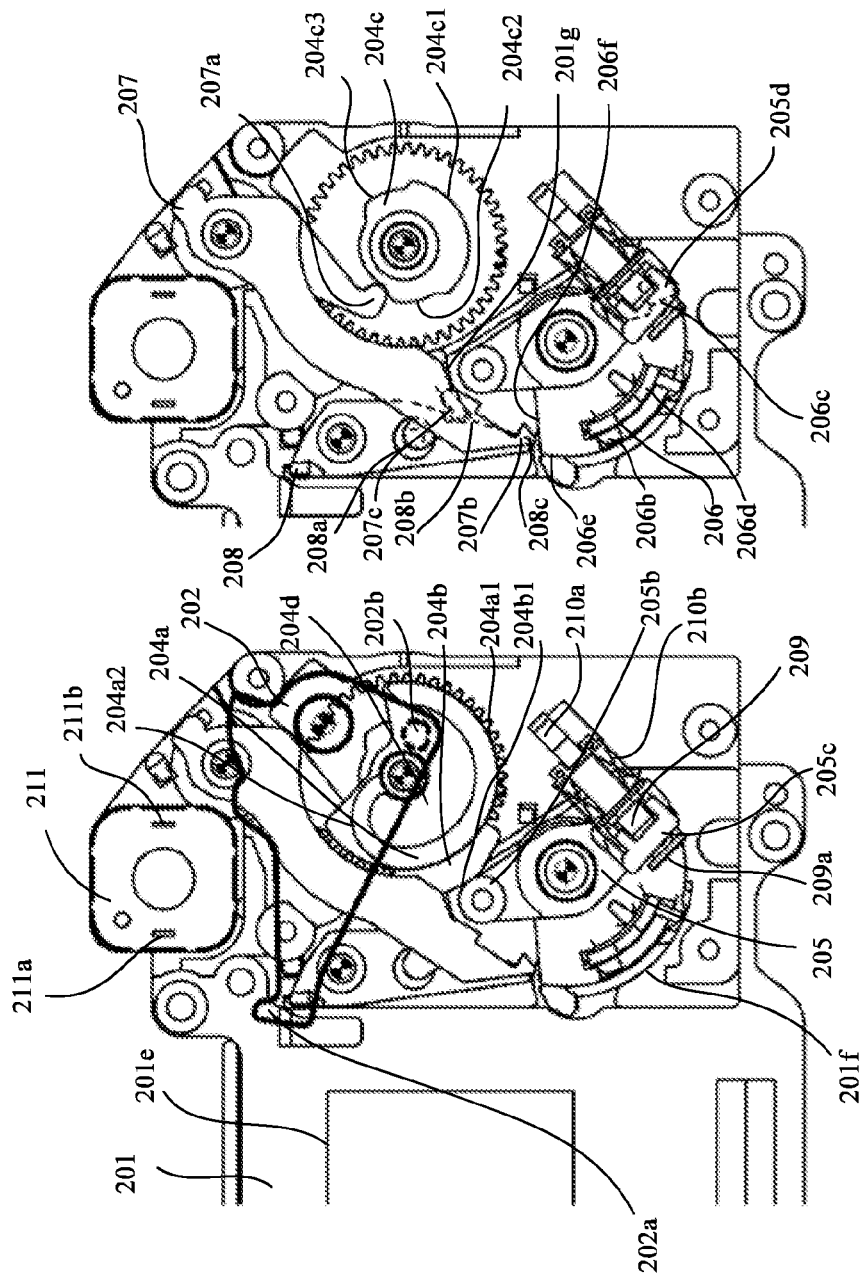

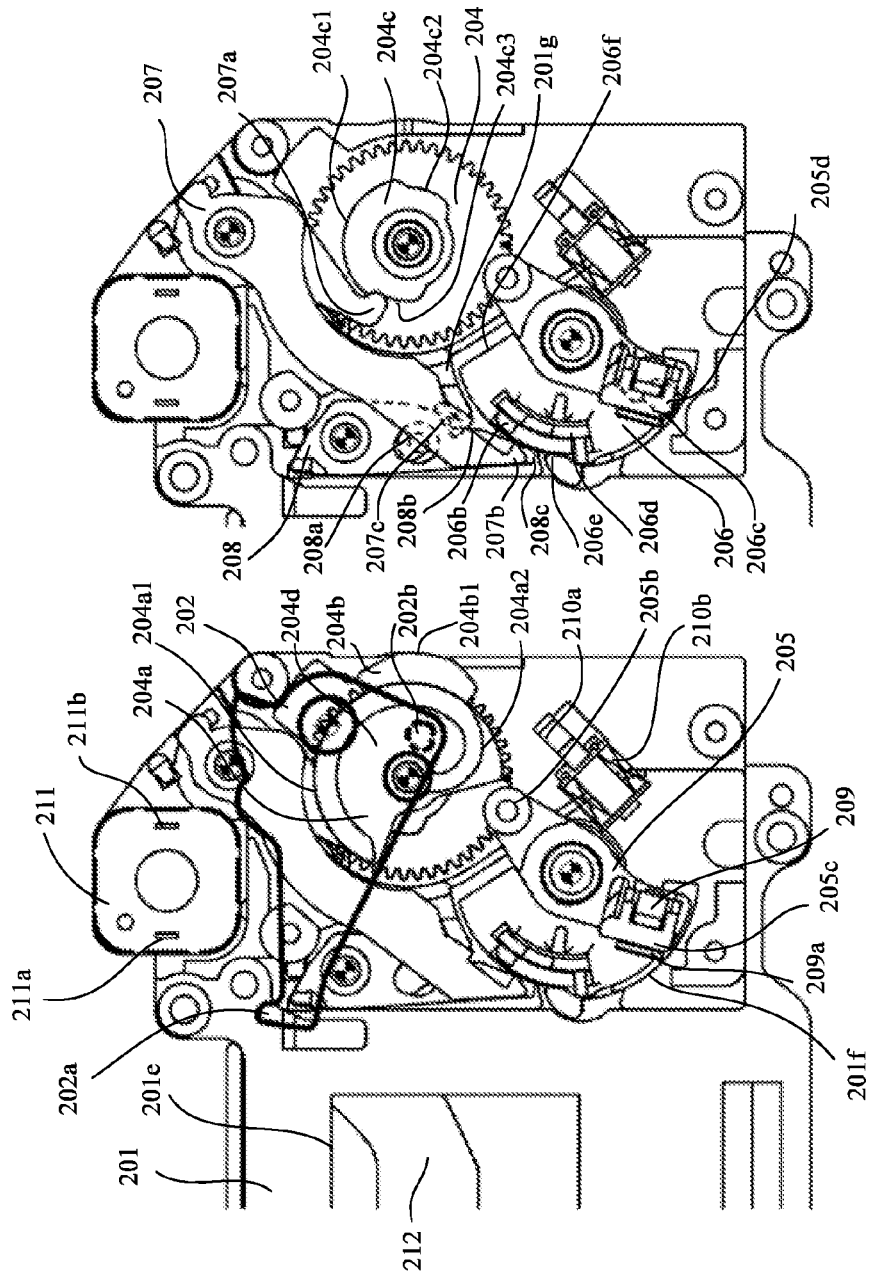

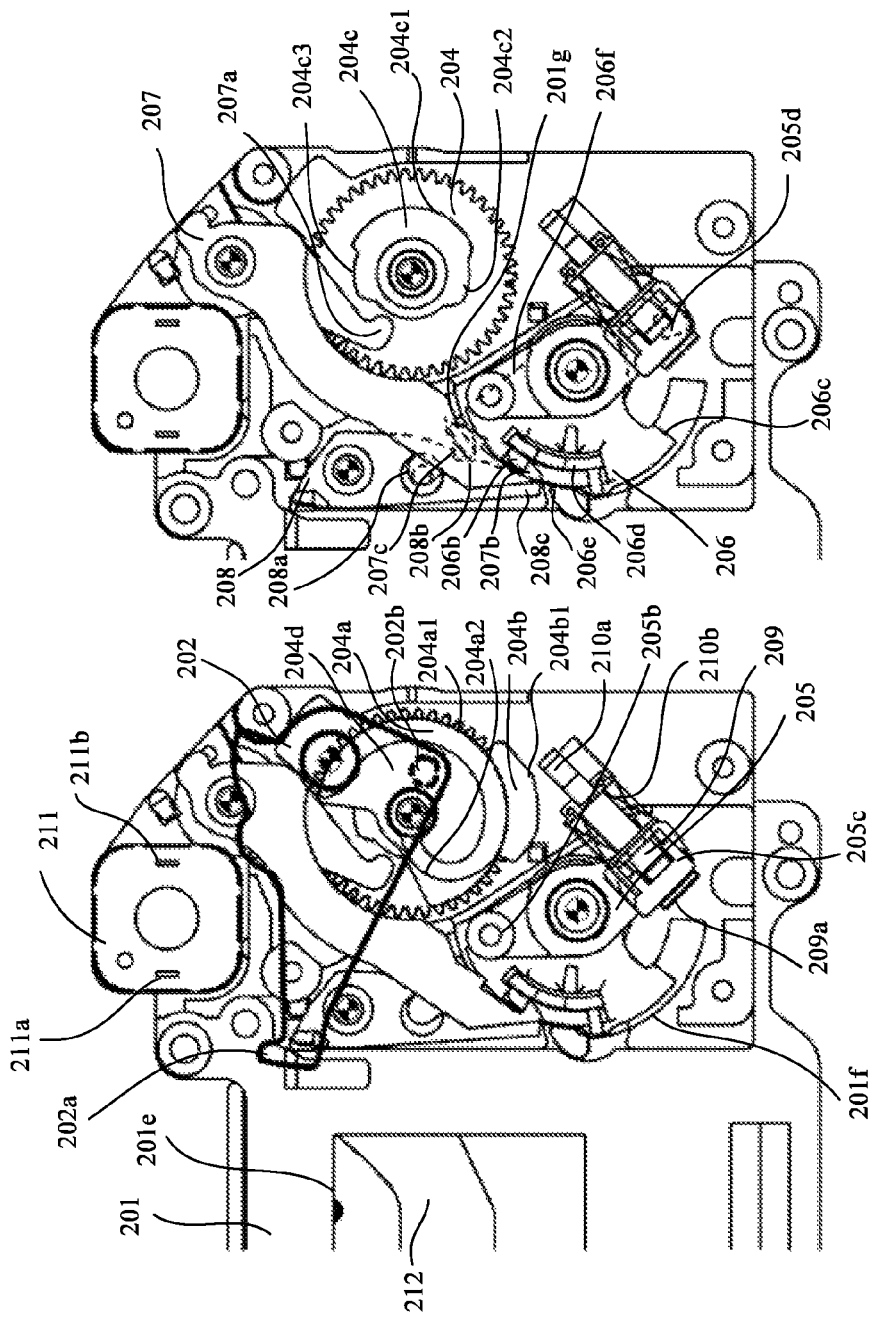

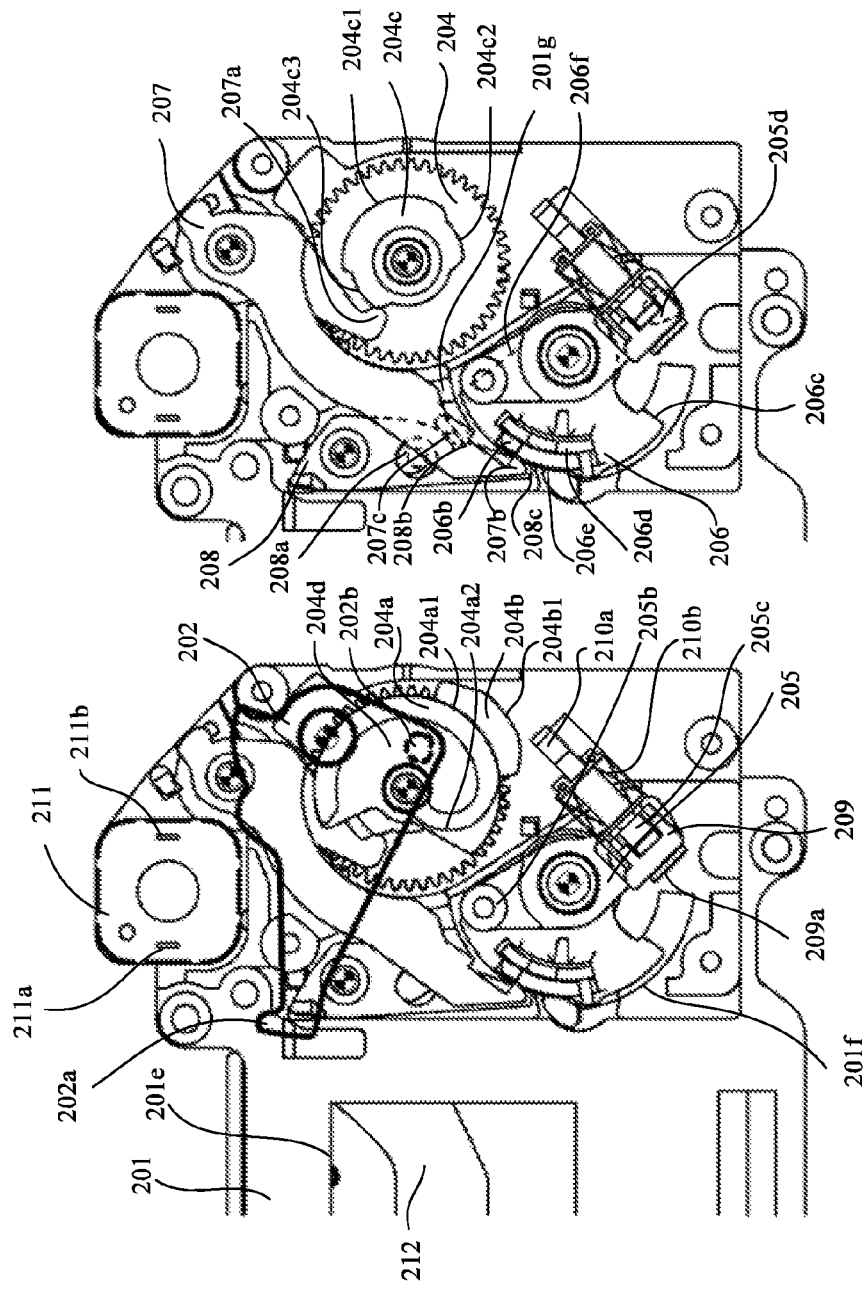

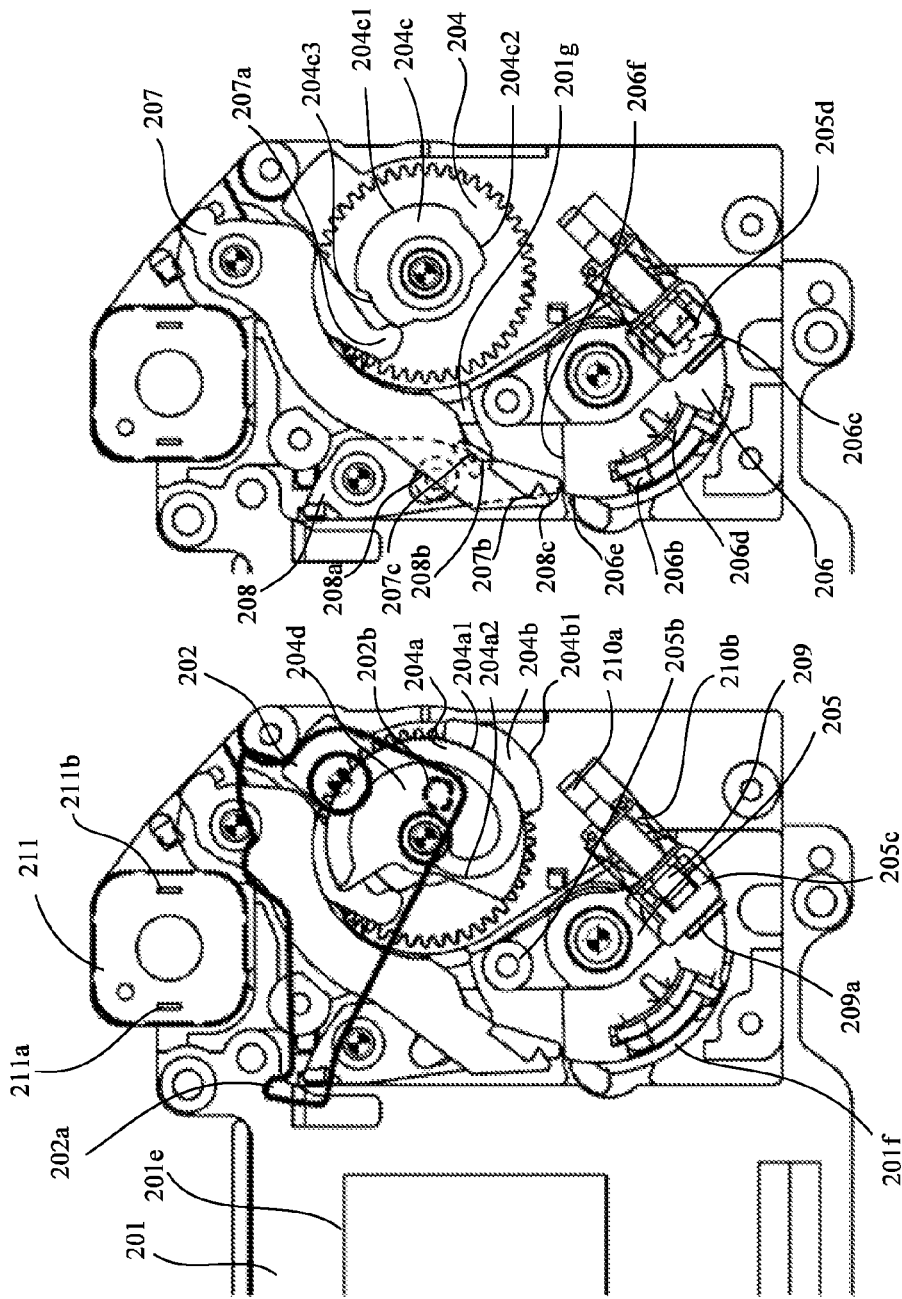

SHUTTER APPARATUS AND IMAGE PICKUP APPARATUS

BACKGROUND OF THE INVENTION

1. Field of the Invention

The present invention relates to an image pickup apparatus such as a shutter apparatus and a digital camera including a shutter.

2. Description of the Related Art

Japanese Patent Laid-Open No. ("JP") 2007-316503 proposes an image pickup apparatus and a shutter apparatus, which perform an image pickup operation with a combination of a focal plane shutter and an electronic shutter. This image pickup apparatus starts an exposure due to charge storage start scan and finishes an exposure operation due to a travelling of blade groups composed of mechanical shutters. In this shutter apparatus, when a charge lever performs a release of a fasten locking member after a driving lever is sucked and held due to an energization to an electric magnet, the blade groups moves from a state closing a shutter opening to a state opening the shutter opening (return operation). After that, when the charge lever performs a release of the driving lever and the energization to the electric magnet is cut at a predetermined timing, the driving lever drives along with the blade lever in a direction in which the blade groups closes the shutter opening.

However, in JP 2007-316503, restoring a bound of the blade groups at the return operation needs a long time. Since a driving lever cannot be driven until the bound restores, in order to guarantee shutter accuracy, there is a problem that the release time lag becomes longer and the continuous shooting speed becomes slower.

Additionally, a digital camera including a function (hereinafter referred to as "live view") has been proposed. The live view is a function which displays an object image shot by an image pickup element on a monitor such as a liquid crystal display ("LCD") as a finder image to observe an object when shooting.

In Japanese Patent Laid-Open No. ("JP") 2012-118346, since a driving lever abuts against a cam top of a cam gear in a live view state, energizing to an electric magnet during the live view does not need.

In Japanese Patent Laid-Open No. ("JP") 2007-279270, a camera, which is selectable both a state performing a mirror driving and a shutter charge driving and a state performing the shutter charge driving in a state stopping a mirror using one motor, is proposed.

However, in JP 2012-118346, since the main mirror and the blade groups cannot independently drive, the main mirror moves when executing a release operation in the live view.

On the other hand, in JP 2007-279270, although a main mirror and blade groups can independently drive using one motor, energizing to the electric magnet in the live view needs. Additionally, since the configuration of the camera becomes complicated configuration including a planetary mechanism, a shutter driving member for the shutter, and a driving member for both mirror/shutter driving, the camera increases in size and in cost.

SUMMARY OF THE INVENTION

In view of the problem, the present invention provides a shutter apparatus and an image pickup apparatus capable of quickly restoring bound at a return operation, capable of shortening the release time lag, and capable of increasing the continuous shooting speed.

Additionally, the present invention also provides an image pickup apparatus capable of moving only blade groups without moving a main mirror in live view, being unnecessary to energize to an electric magnet in the live view, and having a simple configuration driven by a motor.

A shutter apparatus as one aspect of the present invention includes a blade member configured to open and close an exposure opening, a blade moving member configured to move between an opening position in which the blade member opens the exposure opening, and a closing position in which the blade member closes the exposure opening, a locking member configured to move between a locking position in which the blade moving member is locked at the closing position, and a non-locking position in which the blade moving member is not locked at the closing position;

a cam member including a cam portion which abuts against the locking member so as to move the locking member from the locking position to the non-locking position, and a restriction member configured to move between a restriction position in which a movement of the blade moving member from the opening position to the closing position is restricted, and a non-restriction position in which the movement of the blade moving member from the opening position to the closing position is not restricted. The cam member moves the locking member from the locking position to the non-locking position so that the blade moving member moves from the closing position to the opening position. The restriction member moves from the non-restriction position to the restriction position after the blade moving member moves from the closing position to the opening position. The cam member moves the locking member in a direction opposite to a direction from the non-locking position to the locking position so that the locking member moves the restriction member from the restriction position to the non-restriction position.

An image pickup apparatus as one aspect of the present invention includes a blade member configured to open and close an exposure opening, a blade moving member configured to move between an opening position, in which the blade member opens the exposure opening, and a closing position, in which the blade member closes the exposure opening, a locking member configured to move between a locking position, in which the blade moving member is locked at the closing position, and a non-locking position, in which the blade moving member is not locked at the closing position, a cam member including a cam portion which abuts against the locking member so as to move the locking member from the locking position to the non-locking position, and a restriction member configured to move between a restriction position, in which a movement of the blade moving member from the opening position to the closing position is restricted, and a non-restriction position, in which the movement of the blade moving member from the opening position to the closing position is not restricted. The cam member moves the locking member from the locking position to the non-locking position so that the blade moving member moves from the closing position to the opening position. The restriction member moves from the non-restriction position to the restriction position after the blade moving member moves from the closing position to the opening position. The cam member moves the locking member in a direction opposite to a direction from the non-locking position to the locking position so that the locking member moves the restriction member from the restriction position to the non-restriction position.

An image pickup apparatus as one aspect of the present invention includes a mirror, a mirror driving member configured to drive the mirror between a mirror up position and a mirror down position, a first urging member configured to urge the mirror driving member, a blade member configured to open and close an exposure opening, a blade driving member configured to drive the blade member, a second urging member configured to urge the blade driving member, and a charge member configured to drive the mirror driving member against an urging force of the first urging member so as to charge the first urging member and to drive the blade driving member against an urging force of the second urging member so as to charge the second urging member. The charge member includes a mirror charge cam portion which abuts against the mirror driving member and a shutter charge cam portion which abuts against the blade driving member. When the charge member rotates in a first direction in a case where the mirror driving member abuts against the mirror charge cam portion, the charge member charges the first urging member and the second urging member. When the charge member rotates in the first direction in a case where the mirror driving member does not the mirror charge cam portion, the charge member charges the second urging member without charging the first urging member.

Further features of the present invention will become apparent from the following description of exemplary embodiments (with reference to the attached drawings).

BRIEF DESCRIPTION OF THE DRAWINGS

FIGS. 9A, 9B are plan views illustrating a state in which a mirror up operation finishes and a cam gear is positioned at a terminal end of a bound locking phase in the normal mode of the shutter unit.

FIGS. 10A, 10B are plan views illustrating a standby state before travelling in the normal mode of the shutter unit.

FIGS. 13A, 13B are plan views illustrating a completion state of a bound locking set operation in the normal mode of the shutter unit.

FIGS. 19A, 19B are plan views illustrating a completion state of the mirror up operation in the silent mode of the shutter unit.

FIGS. 20A, 20B are plan views illustrating live view state of the shutter unit.

FIGS. 23A, 23B are plan views illustrating a completion state of a bound locking set operation in the live view shooting mode of the shutter unit.

FIGS. 26A, 26B are plan views illustrating a standby state of readout in a shooting operation after second frame in continuous shooting in the live view shooting mode of the shutter unit.

FIGS. 27A, 27B are plan views illustrating a moment of fastening release in the shooting operation after second frame in continuous shooting in the live view shooting mode of the shutter unit.

FIGS. 28A, 28B are plan views illustrating a state in which the blade return operation completes and the bound locking operation is effective in the shooting operation after second frame in continuous shooting in the live view shooting mode of the shutter unit.

DESCRIPTION OF THE PREFERRED EMBODIMENTS

Figure 1:
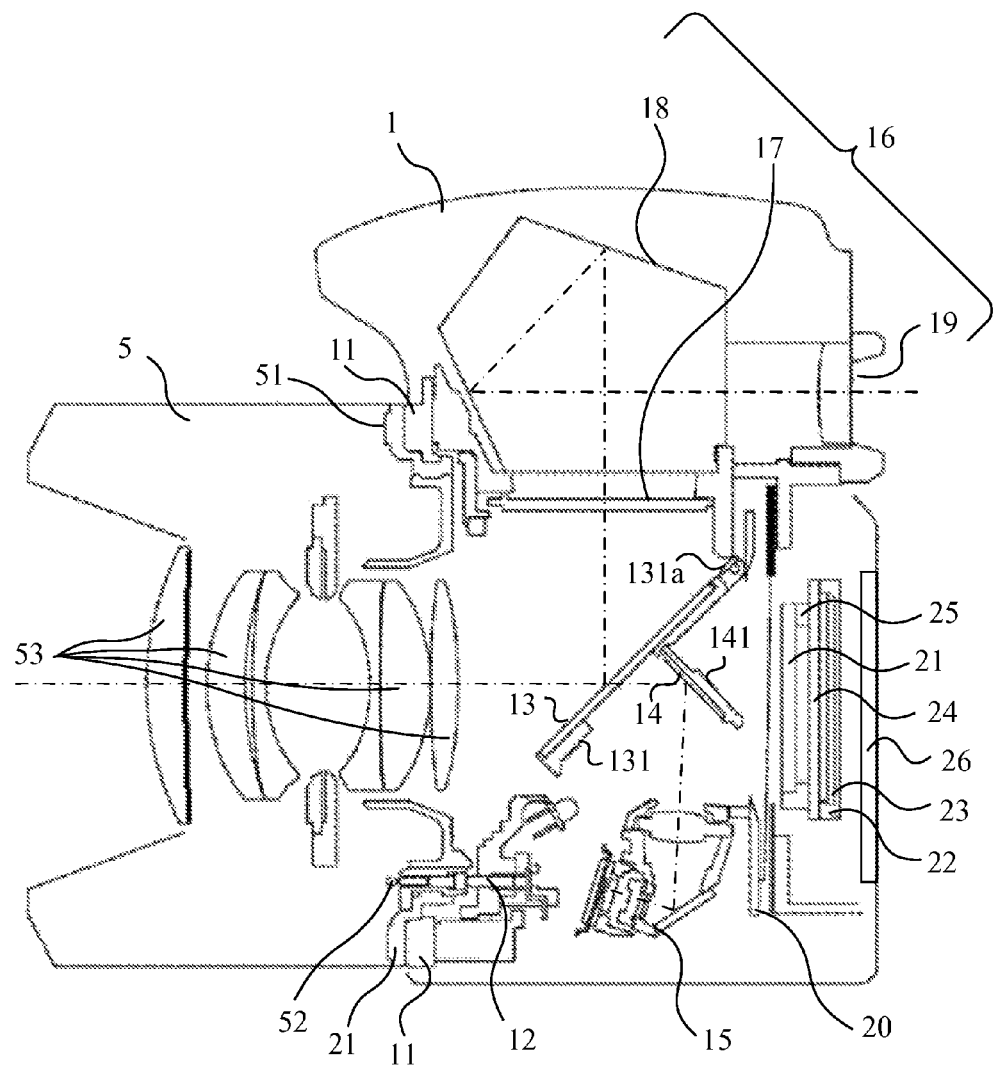
FIG. 1 a central sectional view of a digital single lens reflex camera body and an interchangeable lens as an image pickup apparatus according to this embodiment of the present invention.

Exemplary embodiments of the present invention will be described below with reference to the accompanied drawings. In each of the drawings, the same elements will be denoted by the same reference numerals and the duplicate descriptions thereof will be omitted.

FIG. 1 a central sectional view of a digital single lens reflex camera body (hereinafter referred to as "camera") 1 and an interchangeable lens 5 as an image pickup apparatus according to this embodiment of the present invention.

The interchangeable lens 5 is detachably fixed to the camera 1 by attachment of a mount portion 11 of the camera 1 side and a mount portion 51 of the interchangeable lens 5 side. When the interchangeable lens 5 is attached to the camera 1, a contact portion 12 of the camera 12 electrically couples with a contact portion 52 of the interchangeable lens 5. Thereby, the camera 1 detects attachment of the interchangeable lens 5. Additionally, the camera 1 supplies power to the interchangeable lens 5 and communicates to control the interchangeable lens 5 through the contact portions 12 and 52.

A light flux transmitted a focus lens 53 of the interchangeable lens 5 enters into a main mirror 13 of the camera 1. A main mirror holding frame 131 holds the main mirror 13, and a rotational axis portion 131a pivotally supports the main mirror 13 between a mirror up position and a mirror down position.

The main mirror 13 is a half mirror, and a sub mirror 14 reflects a light flux transmitted the main mirror 13 downward so as to lead to a focus detection unit 15.

A sub mirror holding frame 141 holds the sub mirror 14. A hinge shaft (not illustrated) pivotally supports the sub mirror holding frame 141 relative to the main mirror holding frame 131.

The focus detection unit 15 detects defocus amounts of the focus lens 53 and calculates driving amounts of the focus lens 53 in order to obtain the focusing state of the focus lens 53. The interchangeable lens 5 receives the calculated driving amounts through the contact portions 12 and 52. The interchangeable lens 5 controls a motor (not illustrated) based on the received drive amounts, and drives the focus lens 53 so as to perform focusing.

The light flux reflected by the main mirror 13 is led to an optical finder 16. The optical finder 16 includes a focus board 17, a pentaprism 18, and an eyepiece 19. The light flux led to the optical finder 16 by the main mirror 13 forms an object image on the focus board 17. The user can observe the object image on the focus board 17 through the pentaprism 18 and the eyepiece 19.

A shutter unit 20 is arranged behind the sub mirror 14. Behind the shutter unit 20, an optical low pass filter 21, an image pickup element holder 22, an image pickup element 23, a cover member 24, and a rubber member 25 are arranged. A light flux transmitted the optical low pass filter 21 enters into the image pickup element 23 when shooting. A screw (not illustrated) fixes the image pickup element holder to a chassis of the camera 1. The image pickup element holder 22 holds the image pickup element 23. The cover member 24 protects the image pickup element 23. The rubber member 25 holds the optical low pass filter 21 and seals between the optical low pass filter 21 and the image pickup element 23.

A display monitor 26 is a monitor including a liquid crystal display ("LCD") and displays shooting images and various setting states of the camera 1.

Figure 2:
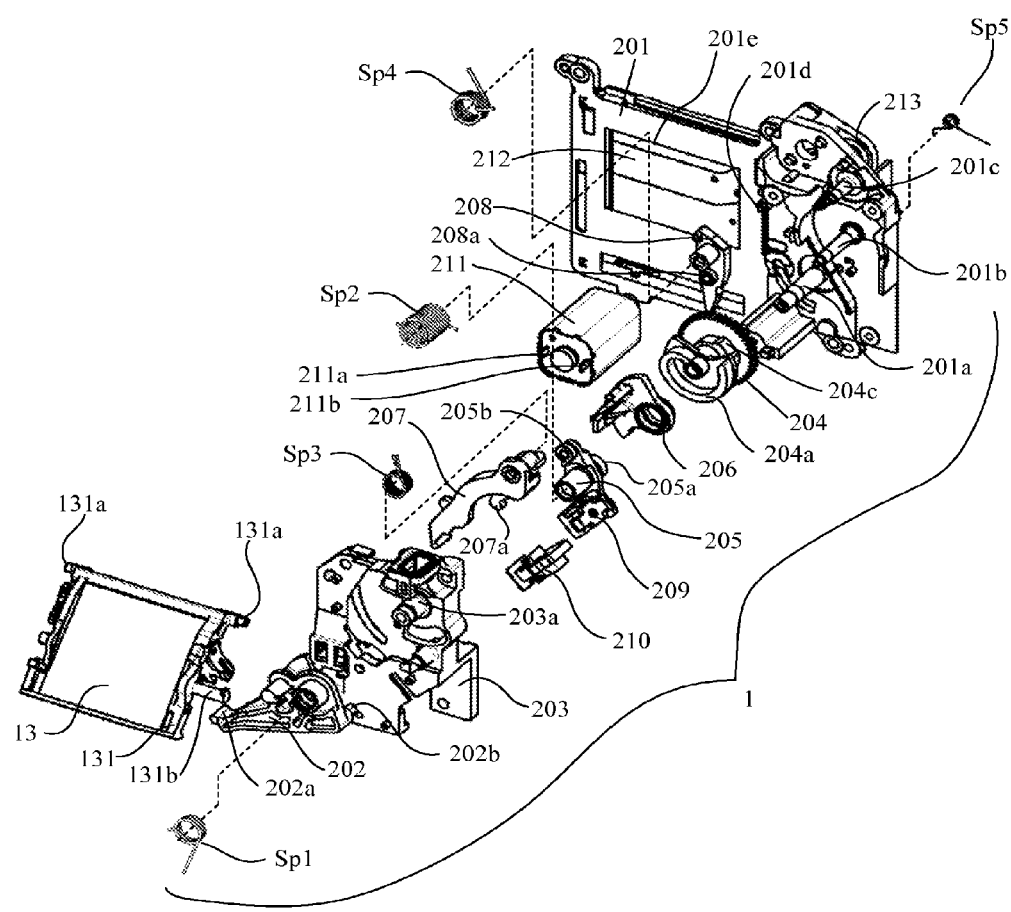
FIG. 2 is an exploded perspective view of a shutter unit.

FIG. 2 is an exploded perspective view of the shutter unit 20 and the main mirror 13.

A shutter base plate 201 is fixed to the mirror box (not illustrated) in the camera 1, and holds each component constituting a drive mechanism of a trailing blade group (blade member) 212. An opening (exposure opening) 201e which an object light flux passes is formed on the shutter base plate 201. When the trailing blade group 212 expands, the opening 201e closes, and when the trailing blade group 212 overlaps, the opening 201e opens. The trailing blade group 212 usually closes.

The mirror driving lever (mirror driving member) 202 is rotatably supported around a shaft portion 203a of a MG base plate 203. An abutment portion 202a formed on the mirror driving lever 202 abuts against a shaft portion 131b which are a driven portion of the main mirror holding frame 131. The main mirror holding frame 131 is urged by a spring (not illustrated) so as to follow a movement of the mirror driving lever 202.

The cam gear (cam member) 204 is rotatably supported around a shaft 201b formed on the shutter base plate 201.

A trailing blade driving lever (blade driving member) 205 is rotatably supported around a shaft 201a formed on the shutter base plate 201. A cylindrical portion 205a is formed on the trailing blade driving lever 205, and a blade lever (blade moving member) 206 is rotatably supported by the cylindrical portion 205a. The blade lever 206 rotates between a close position, in which the trailing blade group 212 closes the opening 201e, and an opening position, in which the trailing blade group 212 opens the opening 201e.

A fastening lever (locking member) 207 is rotatably supported around a shaft 201c formed on the shutter 201. A cam follower 207a provided on the fastening lever 207 abuts against a fastening cam 204c provided on the cam gear 204. When the cam gear 204 rotates, the cam follower 207a traces the fastening cam 204c so as to swing the fastening lever 207.

A bound locking lever (restriction member) 208 is rotatably supported around a shaft 201d formed on the shutter base plate 201. When the fastening lever 207 presses a roller 208a provided on the bound locking lever 208, the bound locking lever 208 rotates. The bound locking lever 208 moves between a restriction position, in which a movement of the blade lever 206 is restricted, and a release position, in which restriction of the movement of the blade lever 206 is released.

An armature 209 is provided on the trailing blade driving lever 205, and an electromagnet 210 is provided on the MG base plate 203. The electromagnet 210 includes a yoke 210a and a coil 210b provided on outer circumference of the yoke 210b. When voltage is applied to the coil 210b, the yoke 210a generates magnetic force and absorbs the armature 209 by this magnetic force.

The motor 211 is attached to the shutter base plate 201. Driving force of the motor 211 is transmitted to the cam gear 204 through a gear train 213 arranged at the back side of the shutter base plate 201, and the cam gear 204 rotates. This rotation rotates the rotation operation of the mirror driving lever 202, the trailing blade driving lever 205, the blade lever 206, the fastening lever 207, and the bound locking lever 208, and as a result, the main mirror 13 can rotate and the trailing blade group 212 can reciprocate. Additionally, terminals 211a and 211b are provided on the motor 211. rotational direction of the motor 211 by setting applied voltage to the terminals 211a and 211b so as to switch a direction of current in the motor 211

Next, the configuration of the shutter unit is explained in detail referring to FIGS. 3A-3C, FIGS. 4A, 4B, and FIGS. 5A, 5B.

In FIGS. 3A-3C, FIGS. 4A, 4B, and FIGS. 5A, 5B, the camera 1 stops.

Figure 3A:
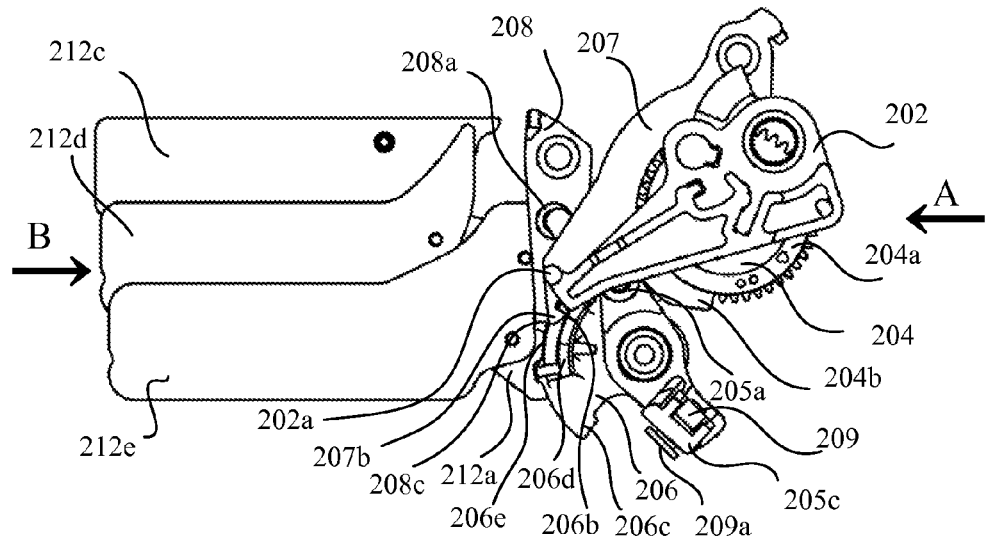
FIGS. 3A-3C are a plan view and perspective views illustrating a substantial part of the shutter unit.
Figure 3B:
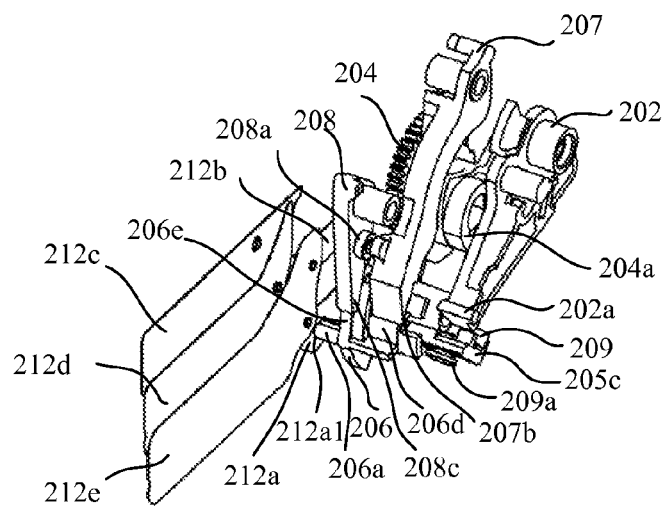
Figure 3C:
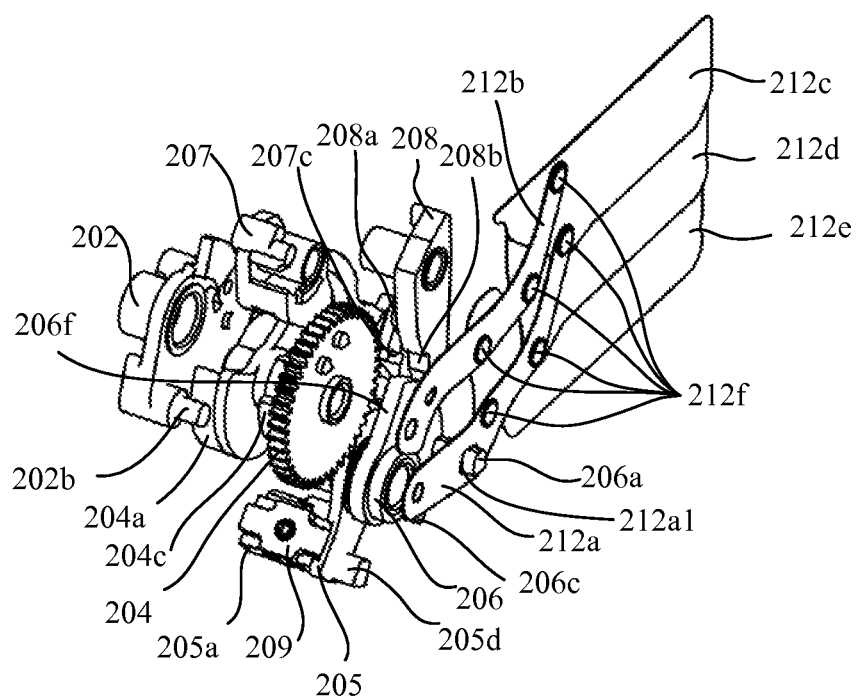

FIGS. 3A-3C are views extracting a substantial part of the shutter unit 20, FIG. 3A is a plan view as seen from the object side (main mirror side in FIG. 2), FIG. 3B is a perspective views as seen from the object side, and FIG. 3C is a perspective views as seen from the photographer side.

Figures 4A, 4B:
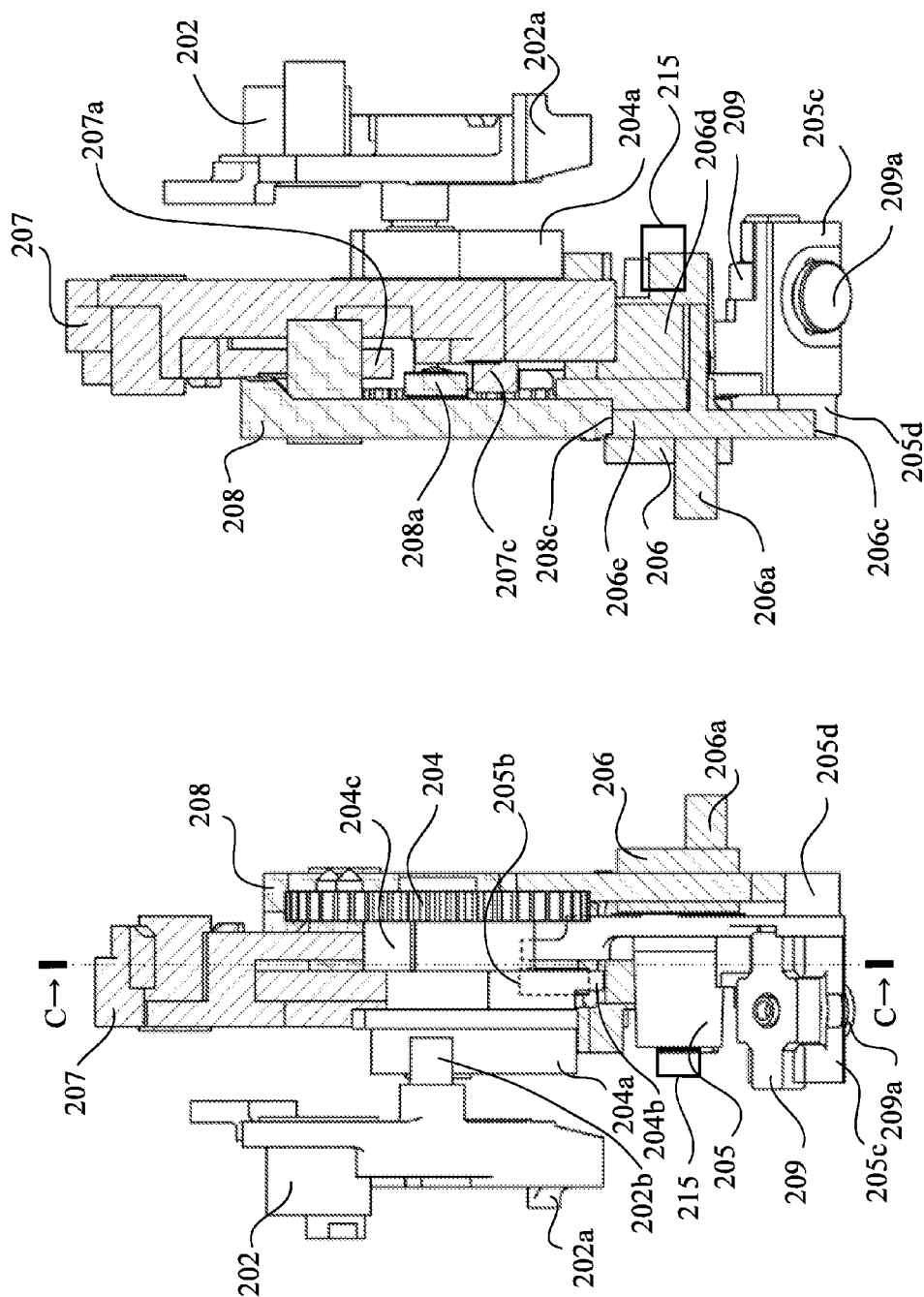
FIGS. 4A and 4B are side views illustrating the substantial part of the shutter unit.

FIGS. 4A, 4B are views extracting a substantial part of the shutter unit 20, FIG. 4A is a side view as seen from the "A" direction of FIG. 3A, and FIG. 4b is a side view as seen from the "B" direction of FIG. 3A.

Figures 5A, 5B:
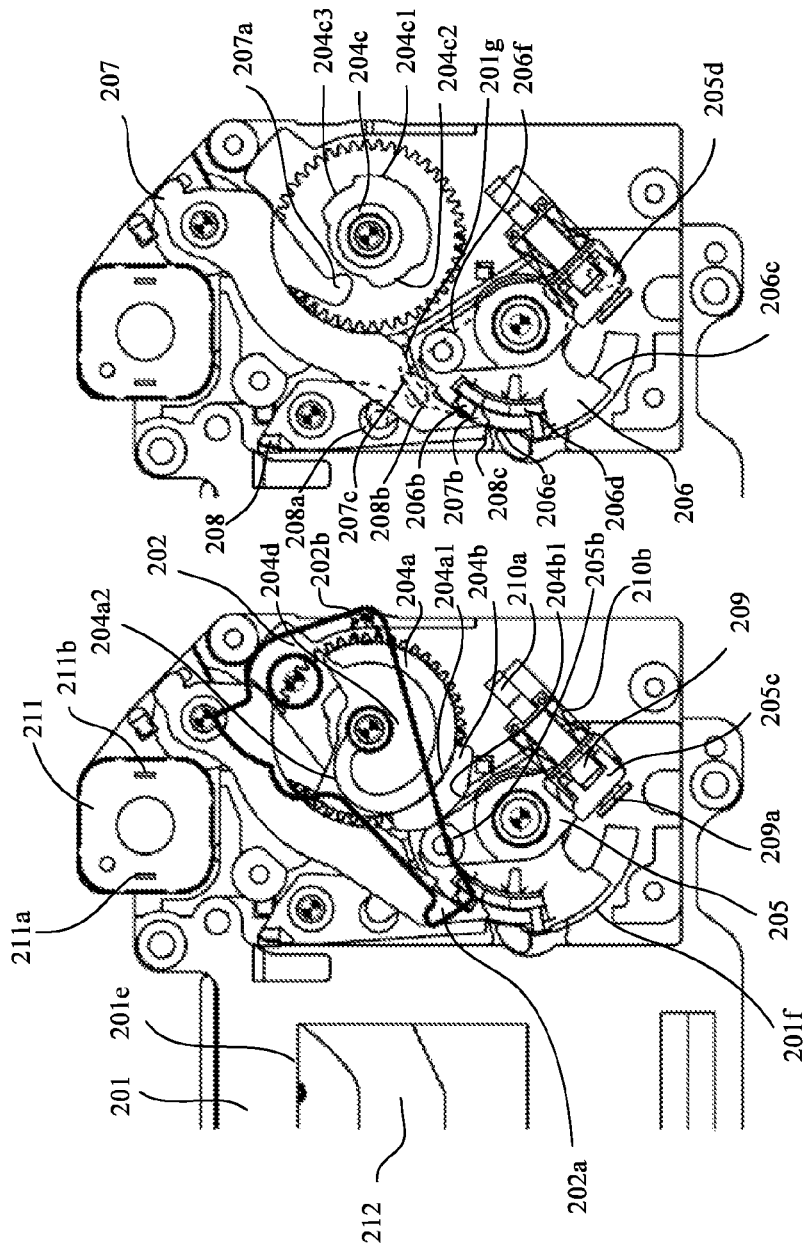
FIGS. 5A, 5B are partial enlarged views of a shutter unit.

FIGS. 5A, 5B are partial enlarged views of the shutter unit 20. FIG. 5A is a plan view only illustrating the approximate right half of the shutter unit 20 as seen from the object side. Only substantial part of the mirror driving lever 202 is illustrated.

FIG. 5B is a view which omits the mirror driving lever 202 from FIG. 5A and only illustrates the cam gear 204 at a section C-C of FIG. 4A. Unnecessary parts are omitted in order to make the figures easily viewable.

In FIGS. 3A-3C, FIGS. 4A, 4B, and FIGS. 5A, 5B, the shutter unit 20 is illustrated when the camera 1 stops.

A mirror driving spring (first urging member) Sp1 is attached to the mirror driving lever 202. In FIGS. 5A, 5B, the mirror driving spring Sp1 urges the mirror driving lever 202 in a clockwise direction (direction making the main mirror 13 the mirror up position). Additionally, a cam follower 202b abuts against a first mirror cam surface 204a1 formed on the mirror cam 204a. The mirror cam 204a performs a charge operation of the mirror driving spring Sp1 of the mirror driving lever 202 through the cam follower 202b.

A trailing blade driving spring (second urging member) Sp2 is attached to the trailing blade driving lever 205. In FIGS. 5A, 5B, the trailing blade driving spring Sp2 urges the trailing blade driving lever 205 in the clockwise direction (direction expanding the blade group 212). Additionally, a roller 205b provided on the trailing blade driving lever 205 abuts against a trailing blade cam (driving cam) 204b formed on the cam gear 204. In FIGS. 5A, 5B, the trailing blade driving lever 205 is in the overcharge state. The trailing blade cam 204b performs a charge operation of the trailing blade driving spring Sp2 attached to the trailing blade driving lever 205 through the roller 205b. The urging force of the trailing blade driving spring Sp2 is stronger than that of a blade lever urging spring Sp5 of a sub arm 212b described below.

Additionally, an armature supporting portion 205c is provided on the trailing blade driving lever 205, and a through hole (not illustrated) is formed on the armature supporting portion 205c. An armature shaft 209a, which is attached to the armature 209 and has a flange portion larger than the internal diameter of the through hole, engages with the through hole. The armature shaft 209a extends in an approximate direction perpendicular to the absorb surface of the armature 209. An armature separating spring (not illustrated) is arranged between the armature 209 and the armature supporting portion 205c. The armature separating spring urges in a direction where the armature 209 and the armature supporting portion 205c are separated each other.

A driving pin 206a provided on the blade lever 206 protrudes a recessed portion 201f formed on the shutter base plate 201, and engages with a hole 212a1 formed on a main arm 212a of the trailing blade group 212. The trailing blade group 212 includes the main arm 212a, the sub arm 212b, a first blade 212c, a second blade 212d, a third blade 212e and a blade swaging dowel 212f, and forms the parallel link mechanism. Additionally, the blade lever urging spring (fifth urging spring) Sp 5 is attached to the sub arm 212b. The blade lever urging spring Sp5 urges in a direction where the trailing blade group 212 overlaps. Since the drive pin 206a engages with the hole 212a1, the blade lever 206 moves along with the main arm 212a. The recessed portion 201f restricts the rotational range of the blade lever 206. Since a protruding portion 206c provided on the blade lever 206 abuts against a convex portion 205d provided on the trailing blade driving lever 205, the blade lever 206 rotates along with the trailing blade driving lever 205 when the trailing blade group 212 expands.

A fastening lever urging spring (third urging member) Sp3 is attached to the fastening lever 207. In FIGS. 5A, 5B, the fastening lever urging spring Sp3 urges the fastening lever 207 in a counterclockwise direction. In FIGS. 3A-3C, FIGS. 4A, 4B, and FIGS. 5A, B5, the cam follower 207a does not abut against the fastening cam (locking cam) 204c, and a locking member 207b of the fastening lever 207 abuts against a wall portion (convex portion) 206d of the blade lever 206. Additionally, the locking portion 207b locks a locked portion 206b provided on the blade lever 206. Therefore, the trailing blade group 212 maintains the expanding state without moving in the overlapping direction.

At this time, the wall portion 206d is provided between the absorption surface of the electromagnet 210 and the armature 209 and the locking surface of the locking portion 207b and the locked portion 206b. Since the locking portion 207b and the locked portion 206b wear each other by repeating locking and locking release between the locking portion 207b and the locked portion 206b, wear powder generates. However, since the wall portion 206d is formed on the above position, the generated wear powder is difficult to adhere to the adsorption surface of the electromagnet 210 and the armature 209. Additionally, since the adsorption surface of the electromagnet 210 and the armature 209 does not face to the locking surface of the locking portion 207b and the locked portion 206b, generated wear powder is difficult to adhere to the adsorption surface of the electromagnet 210 and the armature 209.

The wall portion 206d also has a role of a light shielding wall of a photo interrupter 215 as illustrated in FIG. 4B. Since the wall portion 206d shields or passes output light from the photo interrupter 215, it is possible to detect the position of the blade lever 206.

A torsion coil spring (fourth urging member) Sp4 is provided on the bound locking lever 208. In FIG. 5, the torsion coil spring Sp4 urges the bound locking lever 208 in the counterclockwise direction. Additionally, in FIGS. 5A, 5B, the bound locking lever 208 contacts with a circular portion 206e of the blade lever 206. When the fastening lever 207 swings, a convex portion 207c of the fastening lever 207 abuts against the roller 208a, and then, the bound locking lever 208 swings.

Next, an operation of the shutter unit 20 when actually shooting is explained referring to FIG. 5A-FIG. 29B.

In the following explanation, a finder shooting mode is defined as a mode where the photographer takes a picture checking an object image with the optical finger 16, and a live view mode is defined as a mode where the photographer takes an image checking an object image with the display monitor 26.

Additionally, a normal rotation is defined as a rotation of the cam gear 204 clockwise as seen from the object side, and a reverse rotation is defined as a rotation of the cam gear 204 counterclockwise as seen from the object side. Similarly, a normal rotation direction (first direction) is defined as a rotation direction of the motor 211 when the cam gear performs the normal rotation, and a reverse rotation direction (second direction) is defined as a rotation direction of the motor 211 when the cam gear 204 performs the reverse rotation.

Figure 6:
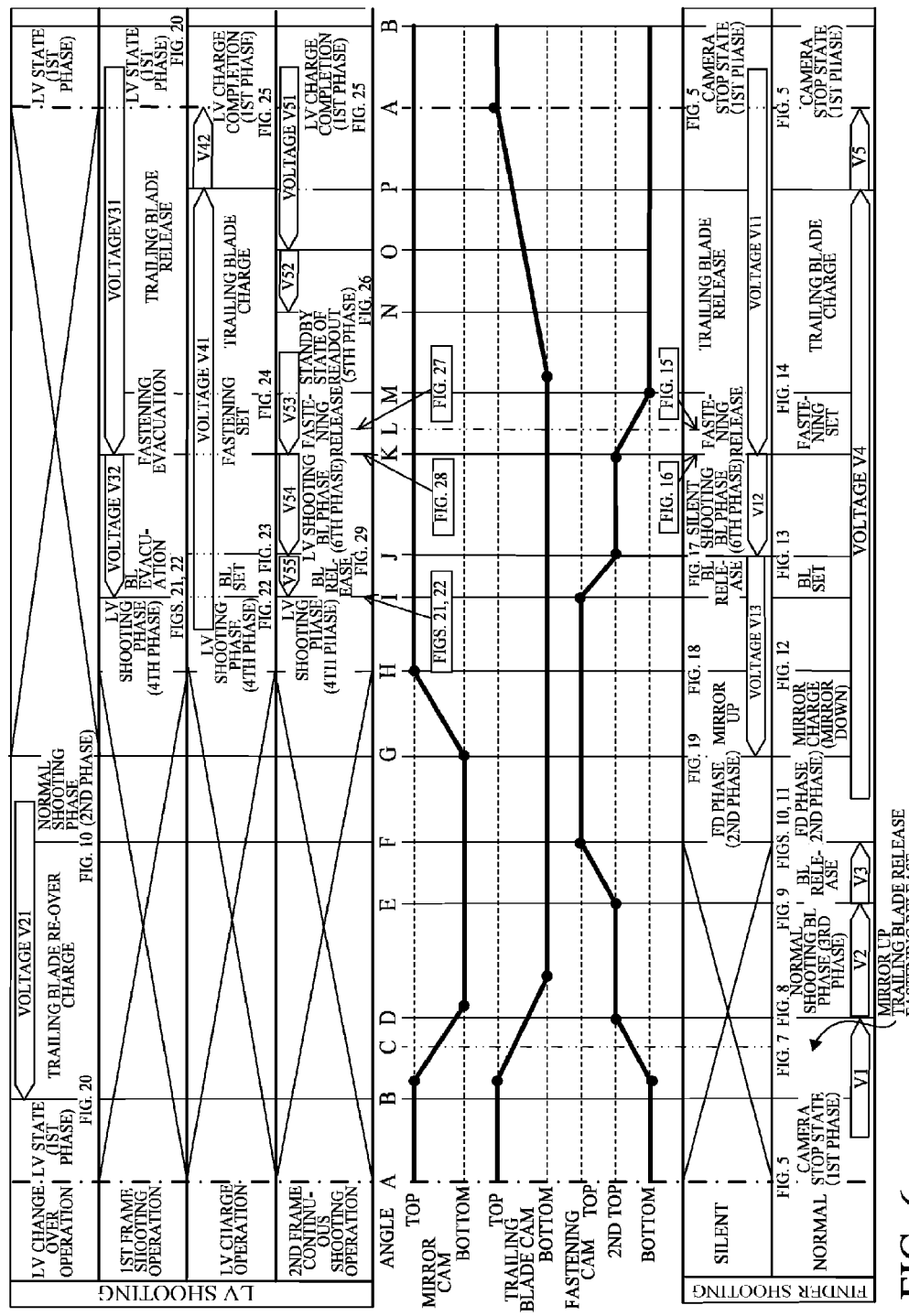
FIG. 6 is a schematic diagram illustrating a cam diagram of a cam gear, a control voltage of a motor, and an operation of mechanism at each phase.

FIG. 6 is a schematic diagram illustrating a cam diagram of the cam gear 204, a control voltage of the motor 211, and an operation of mechanism at each phase. Additionally, FIG. 6 illustrates each control in the finder shooting mode and the live view shooting mode, and the drawing numbers (FIGS. 5A, 5B and FIG. 7A-FIG. 29B) corresponding to each point are also described. In FIG. 6, when the angle progresses in order from the angle A, B, C . . . O, P, and A, the cam gear 204 rotates by 360 degrees. Additionally, in FIG. 6, FD, LV, and BL indicate a finder, a live view, and a bound locking, respectively.

FIG. 7A-FIG. 29B are views illustrating each operation state of the shutter unit 20. In FIG. 7A-FIG. 29B, as FIG. 5A, each figure A is a plan view only illustrating the approximate right half of the shutter unit 20 as seen from the object side. Only substantial part of the mirror driving lever 202 is illustrated. Each figure B is a view which omits the mirror driving lever 202 from each figure A and only illustrates the cam gear 204 at a section C-C of FIG. 4A. Unnecessary parts are omitted in order to make the figures easily viewable.

[Finder Shooting Mode]

First, the finder shooting mode is explained.

The finder shooting mode has a "normal mode", which prioritizes speed up of continuous shooting speed and shortening of the release time lag, and a "silent mode", which prioritizes reduction of a mirror operation sound than speed up of continuous shooting speed and shortening of the release time lag. Here, the mirror operation sound is a collision sound of the main mirror holding frame 131 and the mirror box when the main mirror holding frame 131 operates forward and backward relative to the image pickup optical path.

[Normal Mode]

When the camera 1 is a stop state which is a first state, the cam gear 204 is a camera stop state (first phase) during the angles A-B of FIG. 6. FIGS. 5A, 5B are the state of the angle A. When shooting in the normal mode, the armature 209 absorbs the yoke 210a by energizing to the coil 210b in the camera stop state, and the cam gear 204 performs the normal rotation by applying the voltage to the motor 211 so as to perform the normal rotation. When the cam gear 204 performs the normal rotation, the angle of the cam gear 204 becomes in order from the angle B, C, D, E, and F.

Figures 7A, 7B:
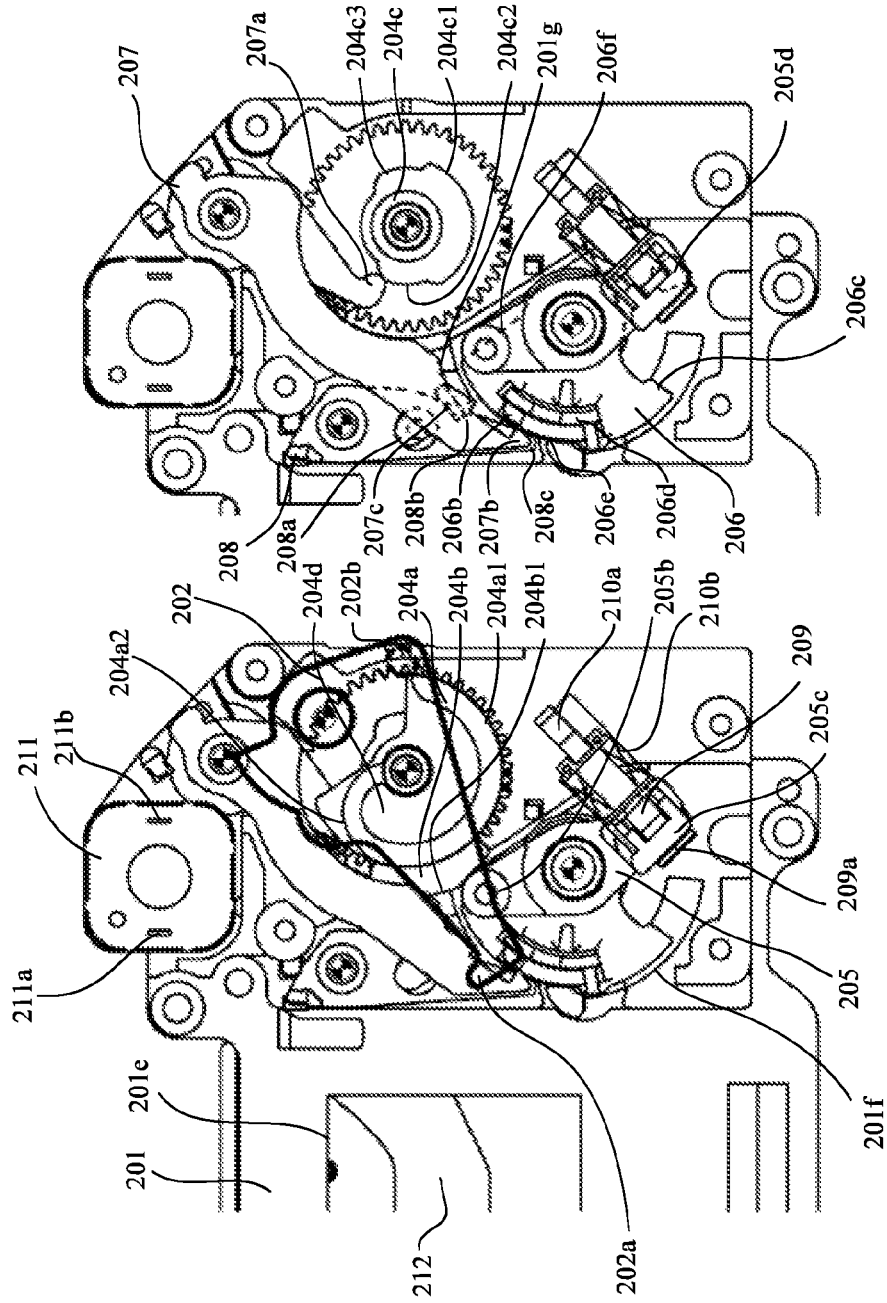
FIGS. 7A, 7B are plan views illustrating a moment of fastening release in normal mode of the shutter unit.

FIGS. 7A, 7B are the state of the angle C, and illustrates a moment of fastening release of the blade lever 206 and the fastening lever 207 when the cam gear 204 performs the normal rotation from the state of FIGS. 5A, 5B. In FIG. 7B, when the fastening cam 204c presses the cam follower 207a, the fastening lever 207 rotates clockwise and the locking portion 207b removes from the locked portion 206b. This state is defined as a "fastening release state".

Figures 8A, 8B:
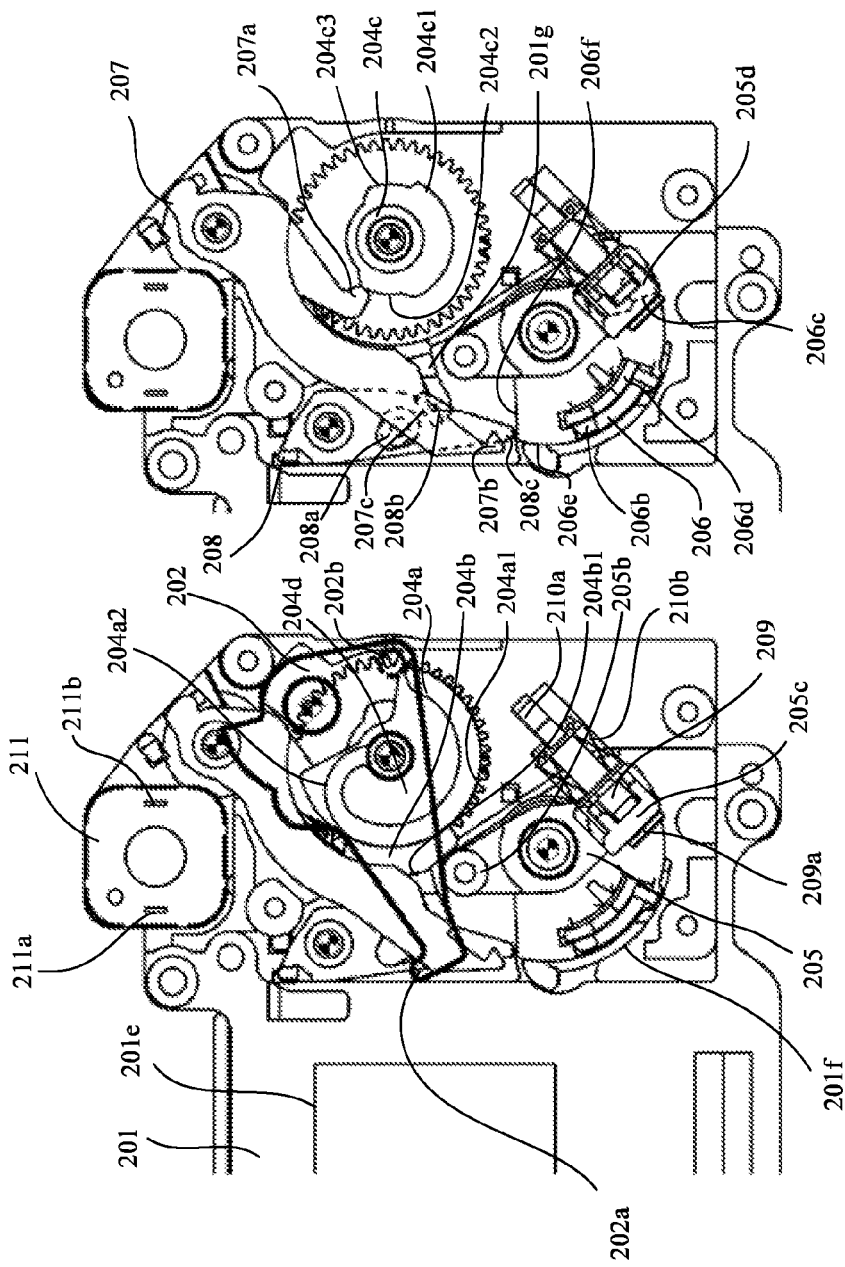
FIGS. 8A, 8B are plan views illustrating a state in which a blade return operation completes and a bound locking operation is effective in the normal mode of the shutter unit.

FIGS. 8A, 8B are the state of the angle D, and illustrates a state that the blade lever 206 rotates counterclockwise from the state of FIGS. 7A, 7B. In FIGS. 7A, 7B, the blade lever 206 rotates counterclockwise by fastening release of the fastening lever 207 and the blade lever 206. At this time, the trailing blade group 212 opens the opening 201e of the shutter base plate 201 from the state closing it. An operation of the blade lever 206 is defined as a "blade return operation".

In FIGS. 5A, 5B and FIGS. 7A, 7B, the bound locking lever 208 stops contacting with the circular portion 206e of the blade lever 206. In FIGS. 8A, 8B, the bound locking lever 208 also rotates counterclockwise according to the rotation of the blade lever 206 counterclockwise, and a stopper 208b of the bound locking lever 208 stops abutting against a convex portion 201g of the shutter base plate 201.

The blade lever 206, which performs the blade return operation, causes a bound, i.e., the protruding portion 206c springs back after colliding with the convex portion 205d of the trailing blade driving lever 205. Since a locking portion 208c of the bound locking lever 208 enters into the movement locus of the blade lever 206 in the clockwise direction, a locked portion 206f of the blade lever 206 abuts against the locking portion 208c, and as a result, bound amounts are restricted. The restriction of bound amounts also suppresses bound time. A series of operations are defined as a "bound locking operation". The position, where the stopper 208b of the bound locking lever 208 abuts against the convex portion 201g of the shutter base plate 201, is the restriction position, where the movement of the blade lever 206 from the opening position to the closing position is restricted. After the blade lever 206 moves from the closing position to the opening position, the bound locking lever 208 enters into the movement locus of the blade lever 206 so that the movement of the blade lever 206 from the opening position to the closing position is restricted.

Additionally, in FIGS. 8A, 8B, the cam follower 207a abuts against a second cam surface 204c2 formed on the fastening cam 204c. In other words, the fastening lever 207 further rotates clockwise from the state of FIGS. 7A, 7B.

Further, in FIGS. 8A, 8B, the roller 205b separates from a cam surface 204b1 of the trailing blade cam 204b, and the overcharge state is released.

FIGS. 9A, 9B are the state of the angle E, and illustrates a state that the cam follower 202b of the mirror driving lever 202 falls from the first mirror cam surface 204a1 of the mirror cam 204a and rotates clockwise. At this time, the abutment portion 202a of the mirror driving lever 202 abuts against the shaft portion 131b (not illustrated in FIGS. 9A, 9B) of the main mirror holding frame 131. The main mirror holding frame 131 abuts against the mirror box and evacuates from an image pickup optical axis. A series of operations are defined as a "mirror up operation".

In FIGS. 9A, 9B, the cam follower 207a abuts against the terminal portion of the second cam surface 204c2. The fastening lever 207, namely, does not move between the state of FIGS. 8A, 8B (angle D) and the state of FIGS. 9A, 9B (angle E).

FIGS. 10A, 10B are the state of the angle F, and illustrates a standby state before travelling (second state) that the fastening lever 207 and the bound locking lever 208 rotate clockwise from the state of FIGS. 9A, 9B. The cam follower 207a transfers from the state tracing the second cam surface 204c2 to the state tracing a first cam surface 204c1 during moving from the state of FIGS. 9A, 9B to FIGS. 10A, 10B, and as a result, the fastening lever 207 rotates clockwise. The first cam surface 204c1 is formed so that a cam diameter from the rotational center to the outside peripheral surface of the first cam surface 204c1 is longer than that of the second cam surface 204c2. When the convex portion 207c presses the roller 208a, the bound locking lever 208 rotates clockwise. At this time, the locking portion 208c of the bound locking lever 208 evacuates from the movement locus of the blade lever 206. A series of operations are defined as a "bound locking release operation". The position, in which the locking portion 208c of the bound locking lever 208 evacuates from the movement of the blade lever 206, is the release position. Before the trailing blade driving lever 205 drives the blade lever 206, the fastening lever 207 moves the bound locking lever 208 from the restriction position to the release position.

Figures 11A, 11B:
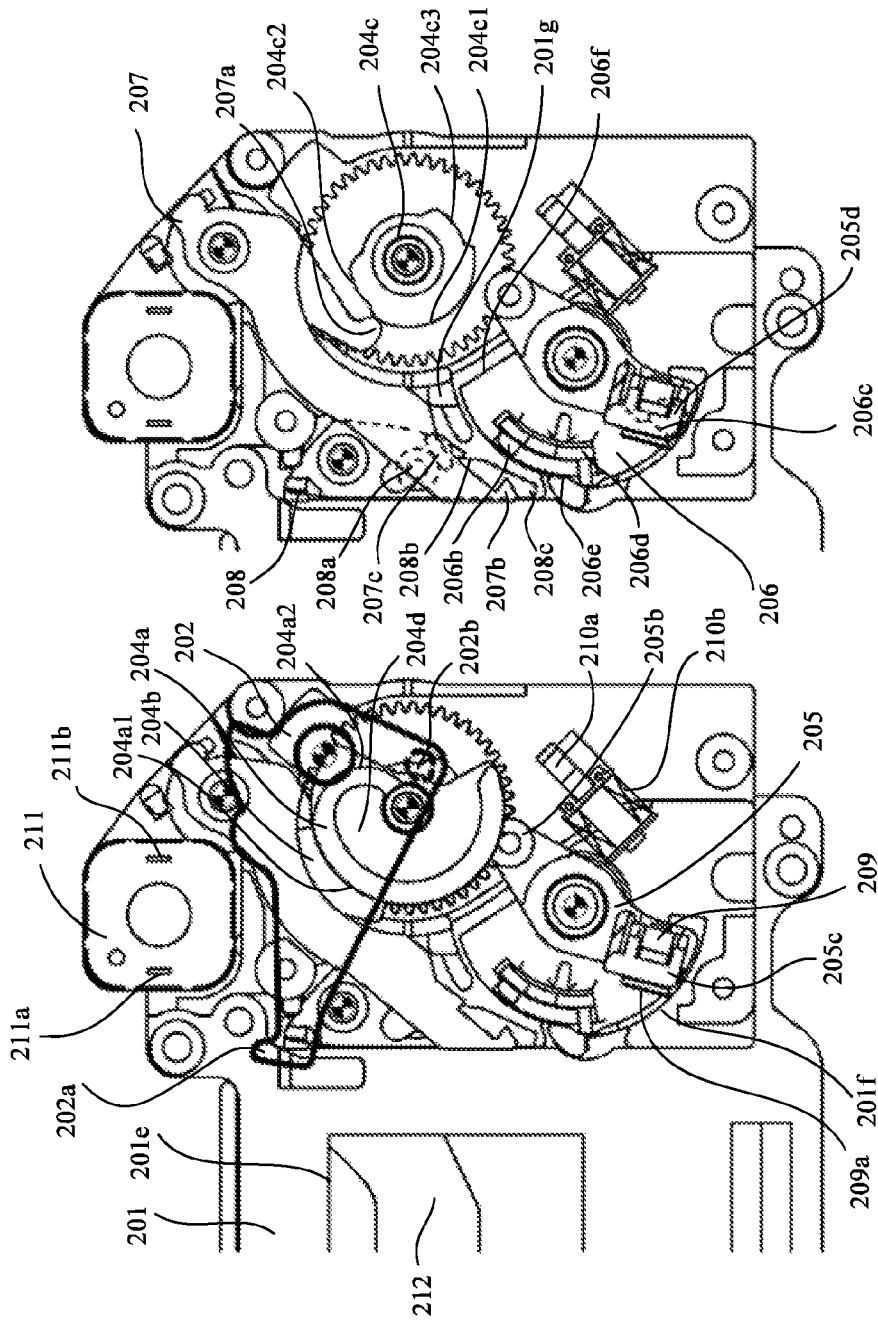
FIGS. 11A, 11B are plan views illustrating a completion state of a travelling operation in the normal mode of the shutter unit.

In FIGS. 10A, 10B, when reset scanning of elements of the image pickup element 23 (hereinafter referred to as "electrical leading blade travelling") is performed, an image pickup exposure operation starts. After starting of the electrical leading blade travelling and passing time interval corresponding to setting shutter time, the armature 209 separates from the yoke 210a due to shut an energization to the coil 210b. When the armature 209 separates from the yoke 210a, the trailing blade driving lever 205 travels clockwise along with the blade lever 206 by the urging force of the trailing blade driving spring Sp2. The trailing blade group 212, then, covers the opening 201e of the shutter base plate 201 as illustrated in FIGS. 11A, 11B. An operation that the trailing blade driving blade lever 205 travels along with the blade lever 206 is defined as a "travelling operation".

Here, the applied voltage to the motor 211 during the angles A-F is explained. First, in the camera stop state, a voltage (first voltage) is applied to the motor 211 so as to perform the normal rotation. The driving force of the motor 211 is transmitted to the cam gear 204 through the gear train 213, and the cam gear 204 performs the normal rotation. When the cam gear 204 becomes the state of the angle D, the applied voltage to the motor 211 is switched to a voltage (second voltage) V2. When the cam gear 204 becomes the state of the angle E, the applied voltage to the motor 211 is switched to a voltage (third voltage) V3. And, when the cam gear 204 becomes the state of the angle F, the terminals 211a, 211b short. In other words, the motor 211 performs short brake so that the cam gear 204 stops during a finder shooting phase (second phase).

The absolute values of the voltages V1-V3 satisfy the following relations.

voltage V1>voltage V2 and voltage V3>voltage V2

The voltage V2 is lower than the voltage V1 so as to certainly perform the bound locking operation. In the range applied the voltage V2 (angles D-E, third phase), as illustrated in FIG. 8A-9B, the bound locking lever 208 enters into a travelling locus of the blade lever 206. However, there is a time lag from the start of the bound by the blade return operation of the blade lever 206 at the angle C to the contact of the locked portion 206f and the locking portion 208c. Therefore, if the blade lever 206 bounds when the voltage V2 is still high, the bound locking lever 208 may evacuate. That is, since the bound locking release operation is performed before the bound locking operation completes, the bound time will extends.

A normal shooting bound locking phase illustrated during the angles D-E may become longer so as to certainly perform the bound locking operation. However, if the bound locking phase is set too long, each phase cannot be effectively allotted relative to a finite angle which is 360 degrees one rotation of the cam gear 204. In other words, when making the voltage V2 lower, 360 degrees of angles can be effectively used, and larger angles can be allowed relative to a work such as charge which needs angles.

After the bound locking operation is performed in the normal shooting bound locking phase, the motor 211 is driven by the voltage V3 higher than the voltage V2 so that the bound locking release operation is performed as early as possible. As a result, shortening of a release time lag and increasing of the continuous shooting speed can be achieved.

After the travelling operation, the voltage of the normal rotation direction is again applied to the motor 211, and the cam gear 204 starts the normal rotation.

Figures 12A, 12B:
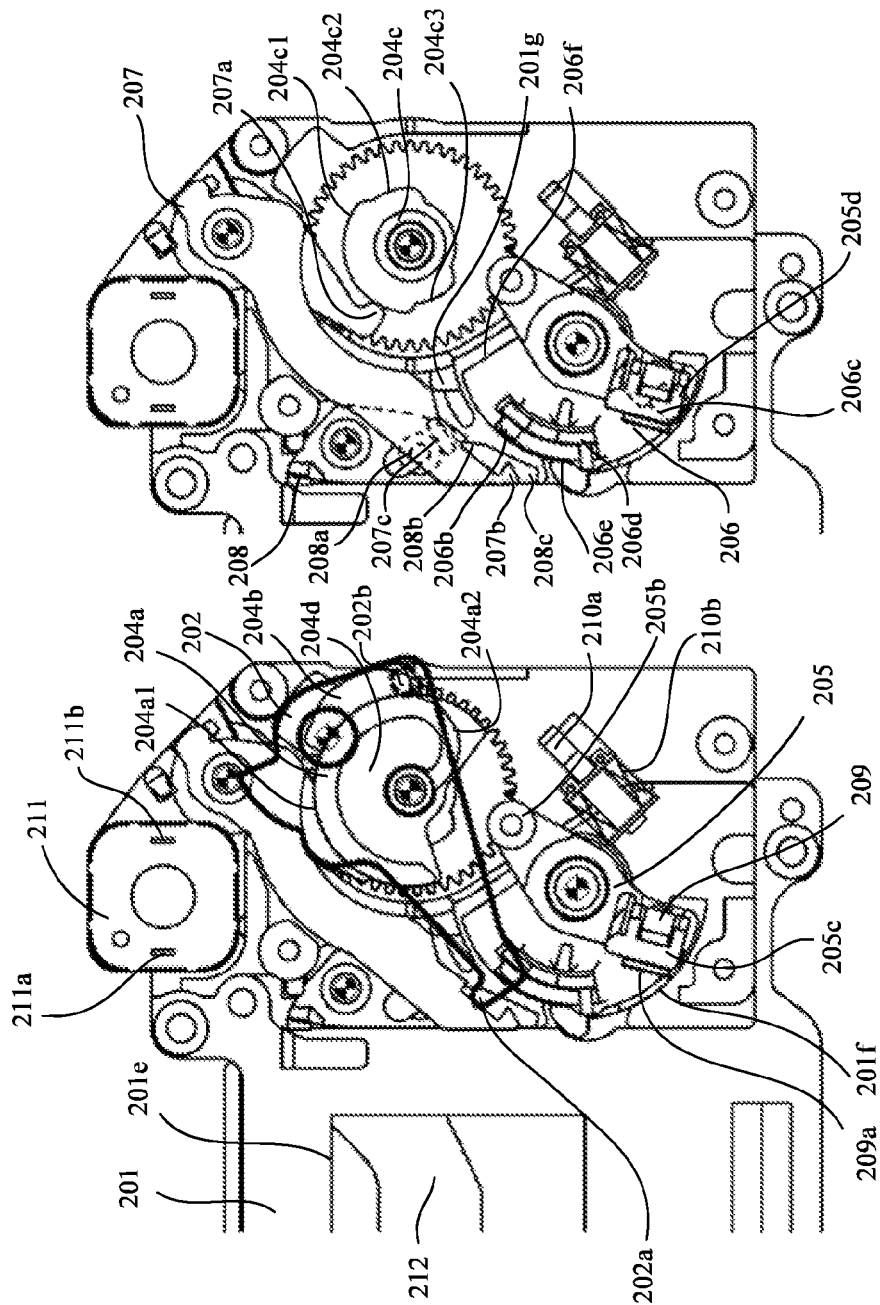
FIGS. 12A, 12B are plan views illustrating a completion state of a mirror charge operation in the normal mode of the shutter unit.

When the second mirror cam surface 204a2 presses the cam follower 202b during the angles G-H, the mirror driving lever 202b rotates counterclockwise. FIGS. 12A, 12B are the state of the angle H, and illustrate the state that the cam follower 202b abuts against the first mirror cam surface 204a1. In FIGS. 12A, 12B, the charge of the mirror driving spring Sp1 completes. The main mirror holding frame 131 downs in conjunction with the mirror driving lever 202, and becomes the mirror down state, in which it enters into the image pickup optical axis. A series of operations are defined as a "mirror charge operation".

When the cam follower 207a transfers from the state tracing the first cam surface 204c1 to the state tracing the second cam surface 204c3 during the angles I-J, the fastening lever 207 rotates counterclockwise. FIGs. 13A, 13B illustrates the state of the angle J. When the fastening lever 207 rotates counterclockwise, the bound locking lever 208 rotates counterclockwise and abuts against the circular portion 206e of the blade lever 206. The roller 208a, then, becomes the state separating from the convex portion 207c. A series of operations are defined as a "bound locking set operation".

Figures 14A, 14B:
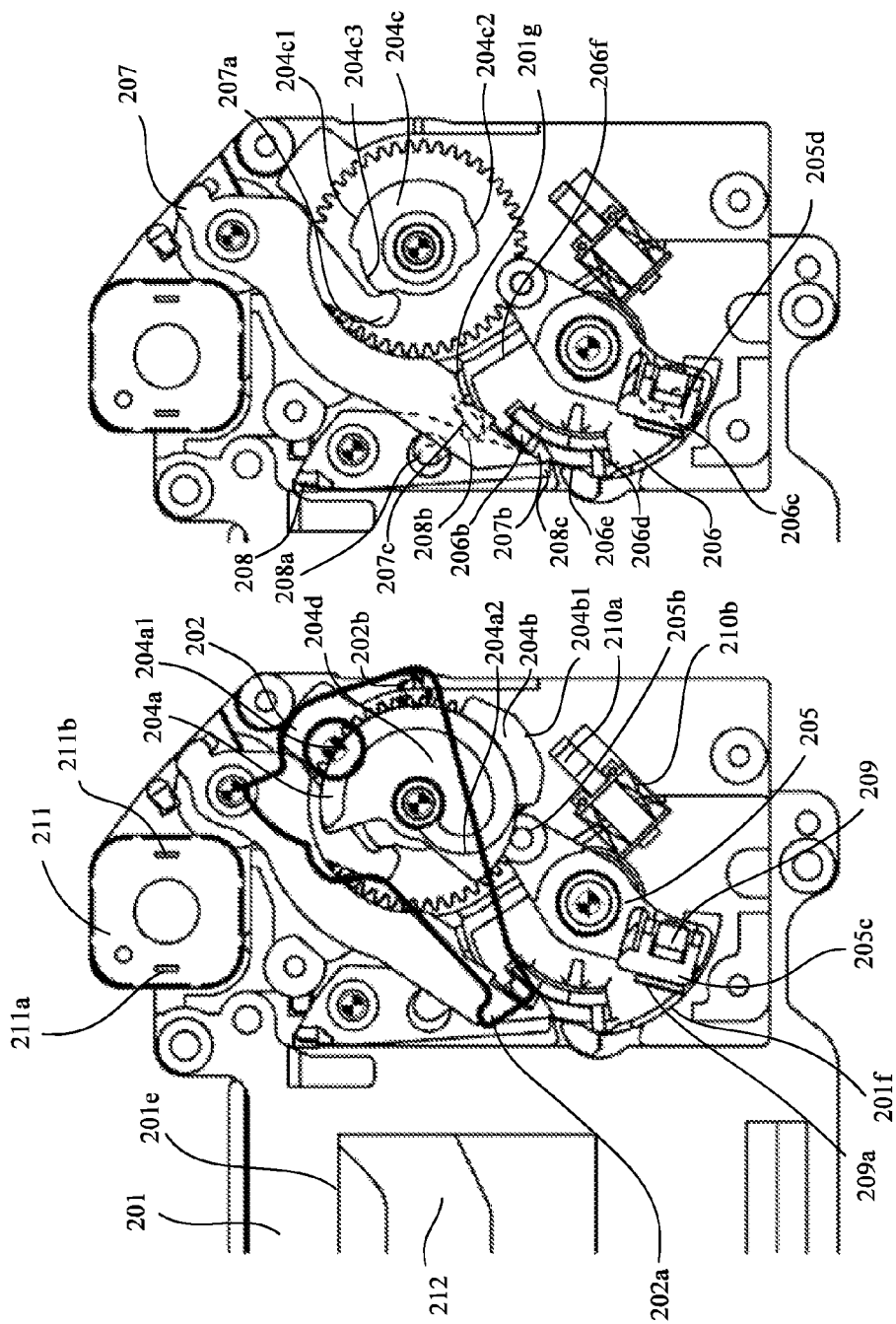
FIGS. 14A, 14B are plan views illustrating a completion state of a fastening set operation in the normal mode of the shutter unit.

The cam follower 207a falls from the second cam surface 204c3 and the fastening lever 207 counterclockwise during the angles K-M. FIGS. 14A, 14B illustrates the state of the angle M, and illustrates a state that the fastening lever 207 abuts against the wall portion 206d of the blade lever 206. This operation of the fastening lever 207 is defined as a "fastening set operation".

When the trailing blade cam 204b of the cam gear 204 presses the roller 205b during the angles M-A, the trailing blade driving spring Sp2 is charged and the shutter unit 20 backs the initial state as illustrated in FIGS. 5A, 5B. This operation is defined as a "trailing blade charge operation". The blade return operation of the blade lever 206, then, is suppressed since the locking portion 207b engages with the locked portion 206b. Additionally, the trailing blade group 212 maintains the state covering the opening 201e of the shutter base plate 201.

Here, the applied voltage to the motor 211 during the angles F-A is explained. When starting the driving, a voltage V4 is applied to the motor 211 so as to perform the normal rotation. The driving force of the motor 211 is transmitted to the cam gear 204 through the gear train 213, and the cam gear 204 performs the normal rotation. When the cam gear 204 becomes the state of the angle P, the applied voltage to the motor 211 is switched to a voltage V5. When the cam gear 204 becomes the state of the angle A, the motor 211 performs short brake so that the cam gear 204 stops in the camera stop state.

The absolute values of the voltages V4, V5 satisfy the following relation.

voltage V4>voltage V5

This voltage control can decrease the overrun of the cam gear 204 at the stopping of the motor 211 than the overrun in the case that the same voltage is applied to the motor 211. In other words, since the phase ranges in the camera stop state can be set smaller and the idle run time in the case that the mirror up operation shortens, the continuous shooting speed can increase.

[Silent Mode]

When shooting in the silent mode, the armature 209 absorbs the yoke 210a by energizing to the coil 210b in the camera stop state, and the cam gear 204 performs the reverse operation by applying the voltage to the motor 211 so as to perform the reverse rotation. When the cam gear 204 performs the reverse rotation, the angle of the cam gear 204 becomes in order from the angle P, O, N, M, L, K, J, I, H and G.

Figures 15A, 15B:
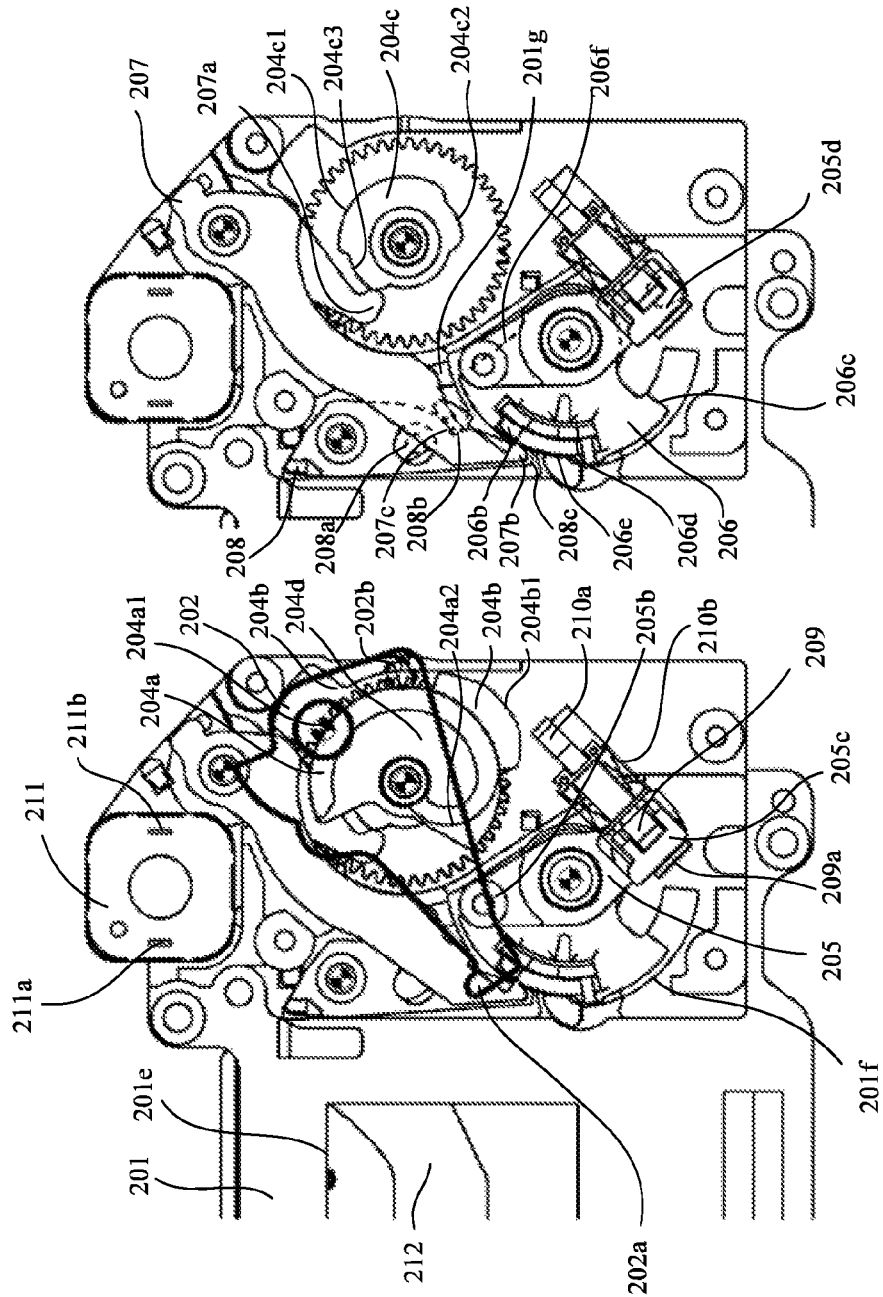
FIGS. 15A, 15B are plan views illustrating a moment of fastening release in silent mode of the shutter unit.

FIGS. 15A, 15B are the state of the angle L, and illustrates a state that the cam gear 204 performs the reverse rotation from the state of FIGS. 5A, 5B and the engagement of the blade lever 206 by the fastening lever 207 deviate. In FIG. 15B, when the cam follower 207a traces the fastening cam 204c, the fastening lever 207 rotates clockwise and the locking portion 207b separates from the locked portion 206b. Additionally, the roller 205b separates from the cam surface 204b1 of the trailing cam 204b and the overcharge state is released.

Figures 16A, 16B:
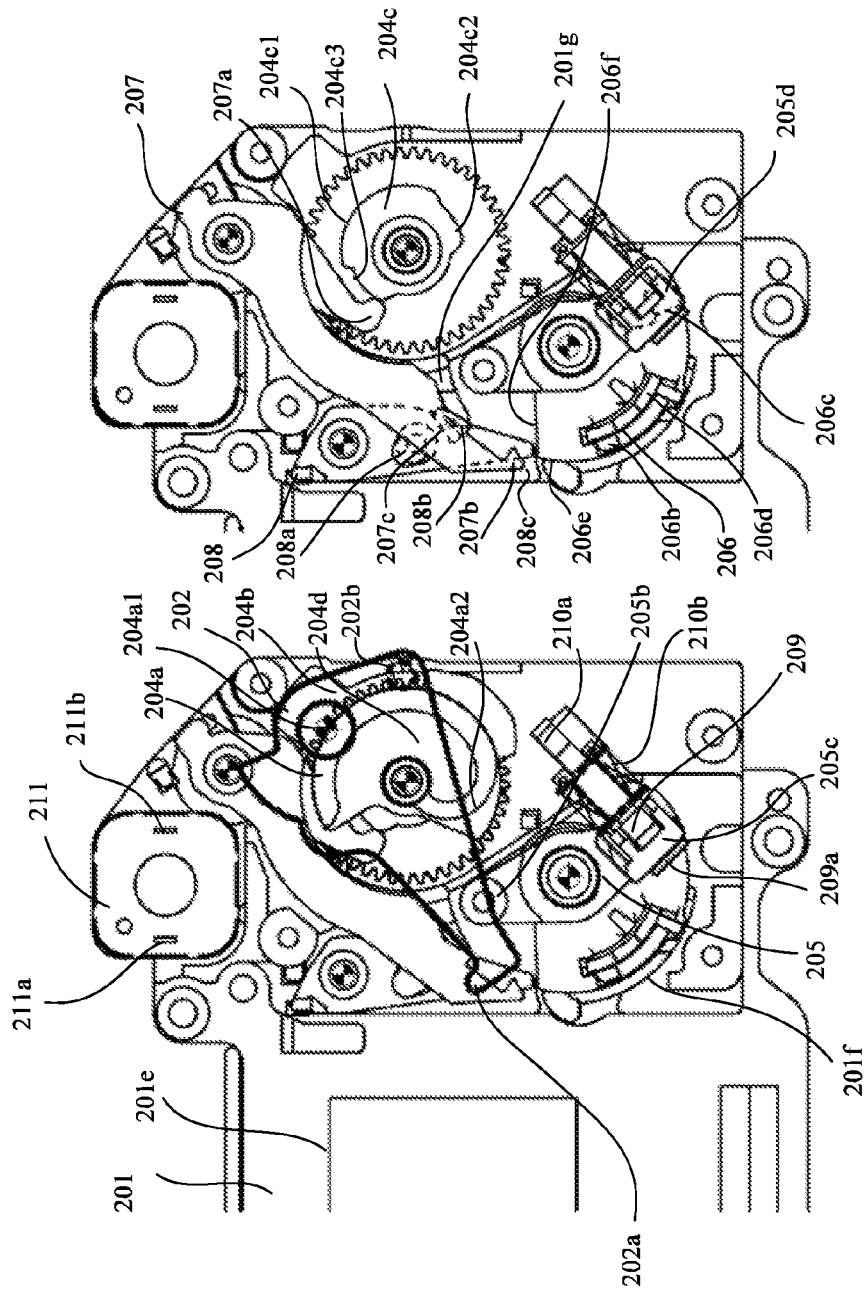
FIGS. 16A, 16B are plan views illustrating a state in which the blade return operation completes and the bound locking operation is effective in the silent mode of the shutter unit.

FIGS. 16A, 16B are the state of the angle K, and illustrates a state that the blade return operation and the bound locking operation are performed.

Figures 17A, 17B:
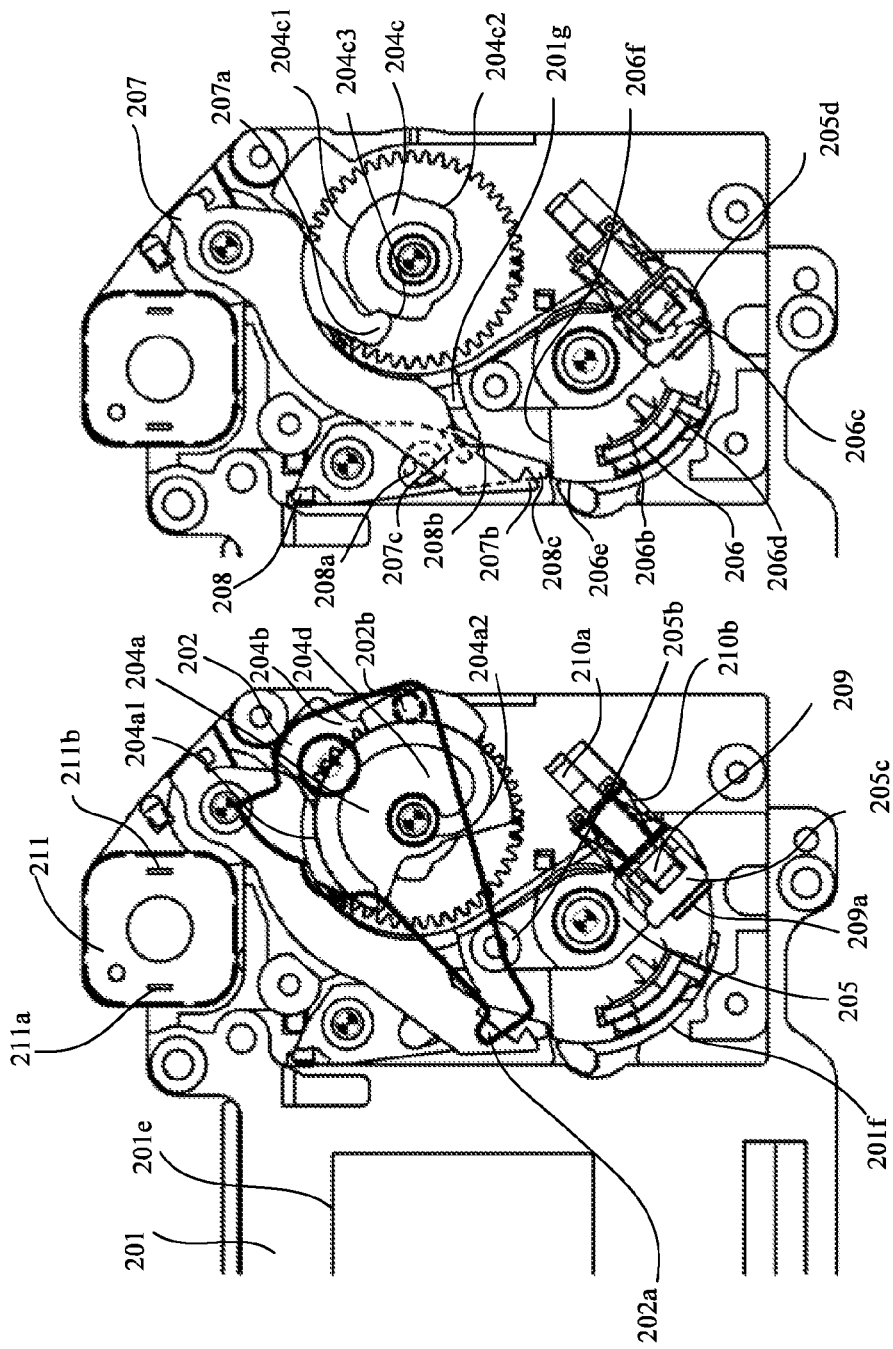
FIGS. 17A, 17B are plan views illustrating a start state of a bound locking release operation in the silent mode of the shutter unit.

FIGS. 17A, 17B illustrates the state of the angle J. In FIGS. 17A, 17B, the cam follower 207a becomes a state tracing the terminal portion of the second cam surface 204c3. That is, the fastening lever 207 does not move between FIGS. 16A, 16B (angle K) and FIGS. 17A, 17B (angle J).

The bound locking release operation is performed during the angles J-I, and the cam gear 204 becomes the state of the angle H.

Figures 18A, 18B:
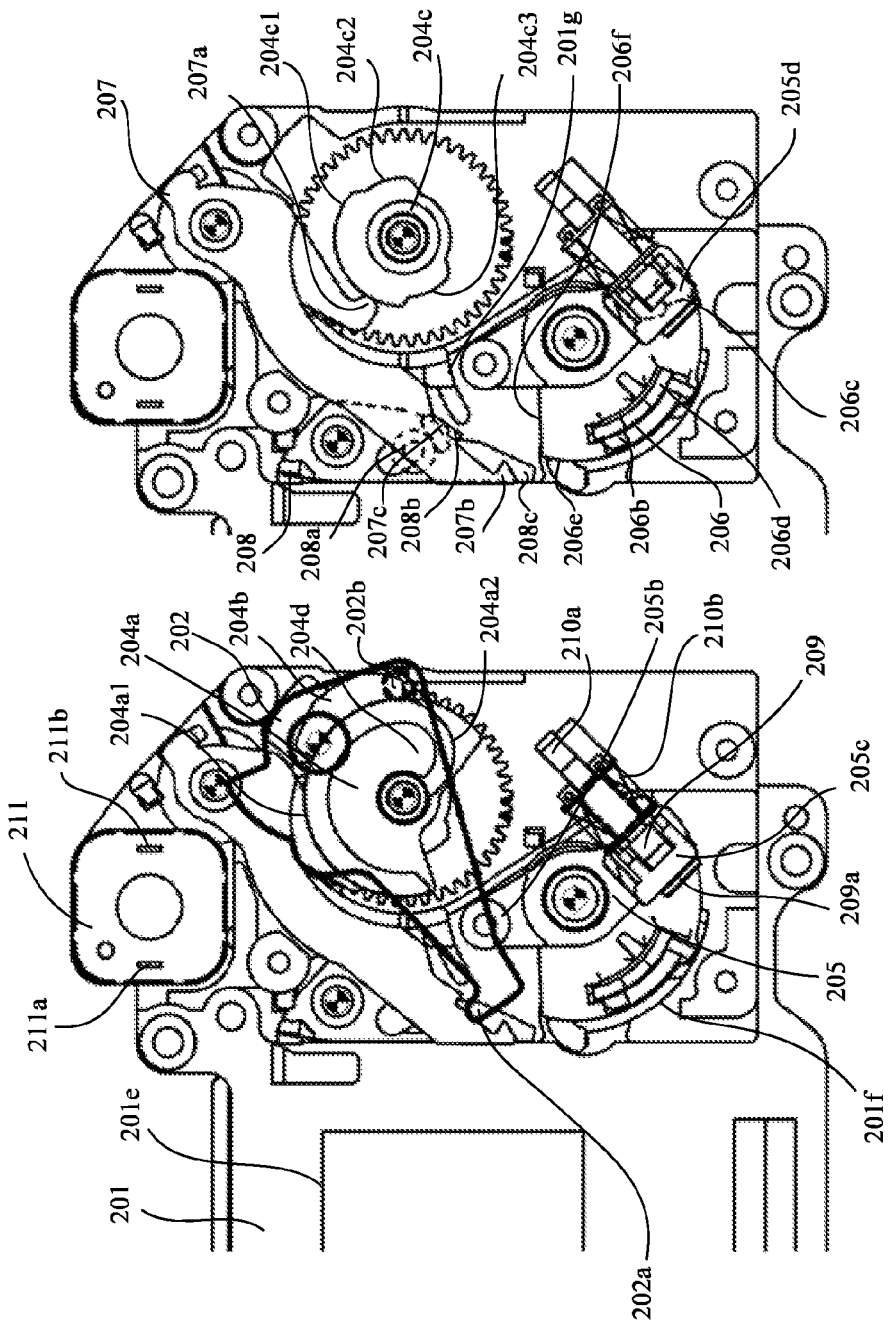
FIGS. 18A, 18B are plan views illustrating a start state of the mirror up operation in the silent mode of the shutter unit.

FIGS. 18A, 18B is the state of the angle H, and illustrates a state that the cam follower 202b contacts with the edge of the first mirror cam surface 204a1.

FIGS. 19A, 19B illustrates the state of the angle G. The cam follower 202b slides the second mirror cam surface 204a2 during the angles H-G, the mirror driving lever 202 rotates clockwise and the mirror up operation is performed.

When the cam follower 202b falls from the first mirror cam surface 204a1, the mirror up operation in the normal mode is executed. On the other hand, when the cam follower 202b slides from the first mirror cam surface 204a1 to the second mirror cam surface 204a2, the mirror up operation in the silent mode is executed. Therefore, when the rotational speed of the cam gear 204 is slowly controlled, the rotational speed of the mirror driving lever 202 when performing the mirror up operation can be slowly controlled. As a result, the mirror operation sound can be small.

Additionally, in the state of FIGS. 19A, 19B, the electrical leading blade travelling and the travelling operation are performed.

Here, the applied voltage to the motor 211 during the angles A-G is explained. First, a voltage V11 is applied to the motor 211 so as to perform the reverse rotation. The driving force of the motor 211 is transmitted to the cam gear 204 through the gear train 213, and the cam gear 204 performs the reverse rotation. When the cam gear 204 becomes the state of the angle K, the applied voltage to the motor 211 is switched to a voltage V12. When the cam gear 204 becomes the state of the angle J, the applied voltage to the motor 211 is switched to a voltage V13. And, when the cam gear 204 becomes the state of the angle G, the motor 211 performs short brake so that the cam gear 204 stops in the finder shooting phase.

The absolute values of the voltages V11-V13 satisfy the following relations.

voltage V11>voltage V12 and voltage V11>voltage V13

The voltage V12 is lower than the voltage V11 so as to certainly perform the bound locking operation during the angles K-J (intermediate phase) as the normal mode. Additionally, the voltage V13 is lower than the voltage V11 so that the mirror operation sound becomes smaller and the rotational speed of the cam gear 207 is slowly controlled.

Conversely, when the voltage V11, which has any relation with the bound locking operation and the mirror operation sound, is highly controlled, shortening of the release time lag and increasing of the continuous shooting speed are achieved as possible.

When the travelling operation is completed, the voltage is applied to the motor 211 so as to performs the normal rotation, the cam gear 204 starts the normal rotation, and the angle of the cam gear 204 becomes in order from the angles G, H, I . . . O, P, A.

Since the operation from the angle G to the angle A is the same operation as the normal mode, detailed explanation is omitted. The description of the operation from the angle G to the angle A in the silent mode in FIG. 6 is also omitted.

[Live View Shooting Mode]

Next, the operation in the live view shooting mode is explained.

The operation in the live view shooting mode has four operations: a live view change over operation, a first frame shooting operation in the live view shooting mode, a live view charge operation, and a second frame continuous shooting operation in the live view shooting mode.

The live view change over operation is an operation from a state, in which the camera 1 stops, to a live view state viewable the object image on the display monitor 26 through the blade return operation and the mirror up operation.

The first frame shooting operation in the live view shooting mode is an operation from the live view state to completion of the travelling operation through the electrical leading blade travelling.

The live view charge operation is an operation from completion of the first frame shooting operation in the live view shooting mode or the second frame continuous shooting operation in the live view shooting mode to completion of the charge of the trailing blade driving spring Sp2.

The second frame continuous shooting operation in the live view shooting mode is an operation from completion of the live view charge operation to completion of the travelling operation through the electrical leading blade travelling.

[Live View Change Over Operation]

The armature 209 absorbs the yoke 210a by energizing to the coil 210b in the camera stop state, and the cam gear 204 performs the normal rotation by applying the voltage to the motor 211 so as to perform the normal rotation. When the cam gear 204 performs the normal rotation, the angle of the cam gear 204 becomes in order from the angle B, C, D, E, and F. The blade return operation and the mirror up operation are performed in this time. In other words, the state of FIGS. 5A, 5B changes the state of FIGS. 10A, 10B. Since this control method is the same as the normal mode in the finder shooting mode, the detailed explanation is omitted. The description of the operation from the angle B to the angle F in the live view change over operation in FIG. 6 is also omitted.

In the finder shooting mode of the normal mode, the state of FIGS. 10A, 10B changes the state of FIGS. 11A, 11B through the electrical leading blade travelling and the travelling operation. In the live view change over operation, the cam gear 204 performs the reverse rotation and changes in order from the angle F, E, D, and B.

FIGS. 20A, 20B illustrates the state of the angle B. The cam follower 202b enters into a concave portion 204d formed the inside of the mirror cam 204a. The cam gear 204 in the mirror up state can perform the reverse rotation by the concave portion 204d. Additionally, since the blade return operation completes, the opening 201e of the shutter base plate 201 opens. Therefore, the object light can be led to the image pickup element 23, and the live view can be performed.

When the energization to the coil 210b is shut, and the object image shot by the image pickup element 23 is displayed on the display monitor 26 after changing into the state of FIGS. 20A, 20B, the shutter unit 20 becomes the live view state (third state).

Since the roller 205b abuts against the cam surface 204b1 of the trailing blade cam 204b, the trailing driving lever 205 does not travel if the energization to the coil 210b is shut. Therefore, since the energization to the coil 210b is unnecessary in the live view, power saving during the live view is achieved.

Although the phases of the cam gear 204 in the live view state and the camera stop state are the same as discussed above, the open and shut state of the trailing blade group 212 and the up and down state of the mirror driving lever 202 of the cam gear 204 are different.

Here, the applied voltage to the motor 211 during the angles F-B is explained. In the live view change over operation, a voltage V21 is applied to the motor 211 so as to perform the reverse rotation from the state of FIGS. 10A, 10B. When the cam gear 204 becomes the state of the angle B, the motor 211 performs short brake.

The absolutes of the voltages V21, V4 satisfy the following relation.

voltage V21<voltage V4

The voltage V4 is set as high voltage so that the continuous shooting speed increases as possible. However, since the mirror charge and the trailing blade charge are operated during the range applying the voltage V4, the rotational speed becomes slower. Additionally, since the short brake is performed after switching the voltage V5, the overrun of the cam gear 204 is suppressed than the overrun in the case of performing short brake from the state of the voltage V4. The first phase of the cam gear 204 during the angles A-B is set to suit the suppressed overrun. Therefore, if the voltage V21 is larger than the voltage V4, the overrun of the cam gear 204 becomes larger. As a result, the cam gear 204 may not be able to stop during the first phase. If the first phase becomes larger, the problem of the overrun does not generate. However, since the idle run of the cam gear 204 at the start of shooting in the normal mode, the release time lag lengthen. In order to avoid the above problem, the voltage V21 is set lower than the voltage V4.

[First Frame Shooting Operation in the Live View Shooting Mode]

The armature 209 absorbs the yoke 210a by energizing to the coil 210b in the live view state (state of FIGS. 20A, 20B). When the cam gear 204 performs the reverse rotation, the angle of the cam gear 204 becomes in order from the angle A, P, O . . . K, J, I.

The overcharge state of the trailing driving lever 205 is released during the angles A-M. When the cam follower 207a slides the second cam surface 204c3 of the cam follower 207a during the angles M-K, the fastening lever 207 evacuates from the travelling locus of the blade lever 206. And, when the cam follower 207a slides the first cam surface 204c1 during the angles J-I, the convex portion 207c pushes the roller 208a so that the bound locking lever 208 evacuates from the travelling locus of the blade lever 206. Thus, the shutter unit 20 becomes a standby state before travelling in the live view mode as illustrated in FIGS. 21A, 21B.

Figures 21A, 21B:
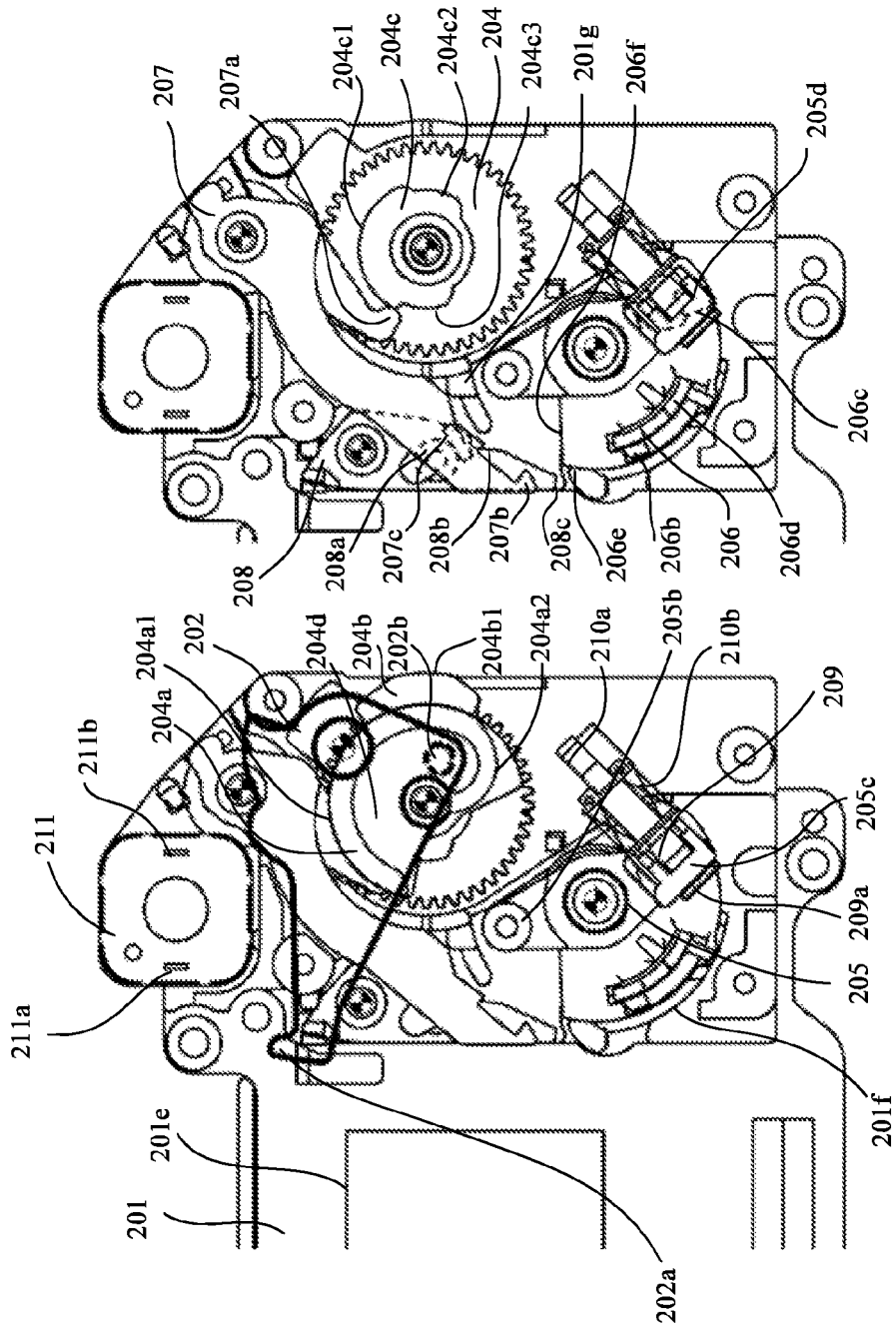
FIGS. 21A, 21B are plan views illustrating a standby state before travelling in live view shooting mode of the shutter unit.

In FIGS. 21A, 21B, the cam follower 202b enters into the concave portion 204d as the live view change over operation. The cam gear 204 can further perform the reverse rotation from the live view state by the concave portion 204d.

Figures 22A, 22B:
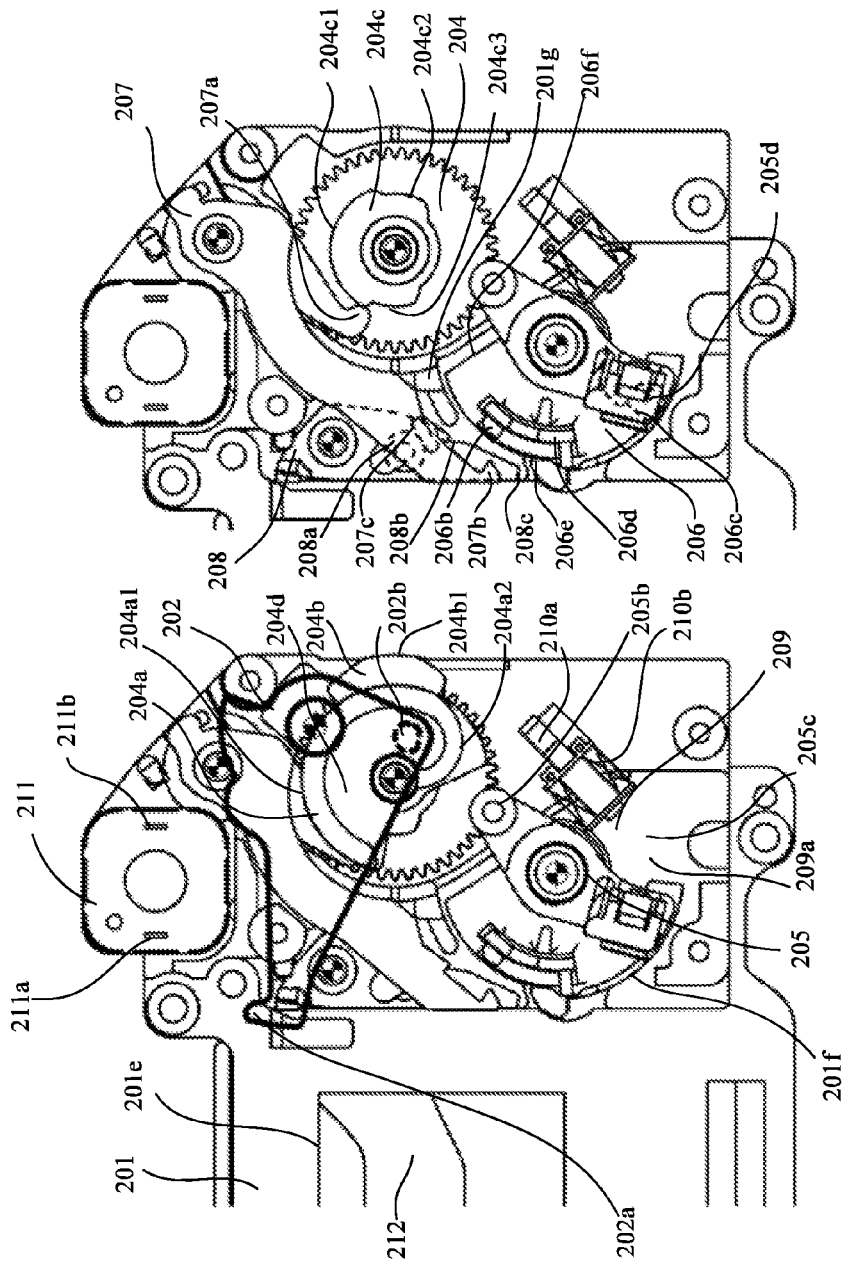
FIGS. 22A, 22B are plan views illustrating a completion state of a travelling operation in the live view shooting mode of the shutter unit.

After the electrical leading blade travelling and the travelling operation are performed from the state of FIGS. 21A, 21B, the shutter unit 20 becomes a travelling completion state in the live view mode as illustrated in FIGS. 22A, 22B.

Here, the applied voltage to the motor 211 during the angles A-I is explained. First, a voltage V31 is applied to the motor 211 so as to perform the reverse rotation. The driving force of the motor 211 is transmitted to the cam gear 204 through the gear train 213, and the cam gear 204 performs the reverse rotation. When the cam gear 204 becomes the state of the angle K, the applied voltage to the motor 211 is switched to a voltage V32. And, when the cam gear 204 becomes the state of the angle I, the motor 211 performs short brake so that the cam gear 204 stops during a live view shooting phase (fourth phase).

The absolutes of the voltages V31, V32 satisfy the following relation.

voltage V31>voltage V32

This voltage control can decrease the overrun of the cam gear 204 at the stopping of the motor 211 than the overrun in the case that the same voltage is applied to the motor 211. In other words, since the range of the live view shooting phase can be set smaller, the degree of freedom in setting of the second mirror cam surface 204a2 and the concave portion 204d increases. As illustrated in FIGS. 21A, 21B, the second mirror cam surface 204a2 and the concave portion 204d have a front-back relation. If the overrun of the cam gear 204 is large, the concave portion 204d needs a larger range. Thus, the range of the second mirror cam surface 204a2 must be reduced so that the concave portion 204d does not penetrate the second mirror cam surface 204a2. If the range of the second mirror cam surface 204a2 becomes smaller, the load to the cam gear 204 during the charge of the mirror increases. However, if the overrun is small, the influence of the above problem can decrease. Additionally, when the overrun is small, the idle run time in the live view charge operation shorten and the continuous shooting speed increases.

[Live View Charge Operation]

When the cam gear 204 performs the normal rotation from the state of FIGS. 22A, 22B, and the angle of the cam gear 204 becomes in order from I, J, K . . . O, P, A, the live view charge operation is performed.

The bound locking set operation is performed during angles I-J so that the shutter unit 20 becomes a completion state of the bound locking set operation in the live view shooting mode as illustrated in FIGS. 23A, 23B.

Figures 24A, 24B:
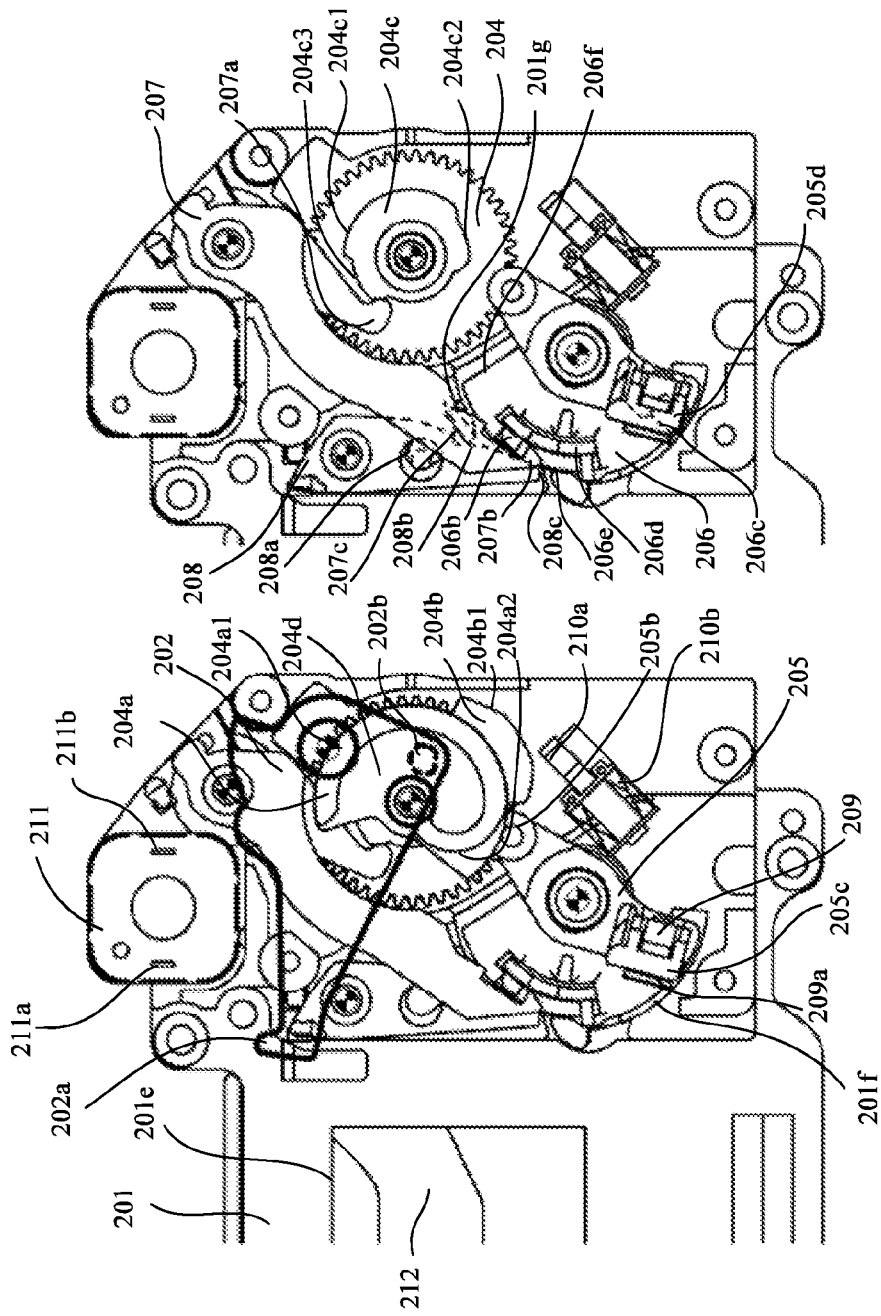
FIGS. 24A, 24B are plan views illustrating a completion state of a fastening set operation in the live view shooting mode of the shutter unit.

The fastening set operation is performed during the angles K-M so that the shutter unit 20 becomes a completion state of the fastening set operation in the live view shooting mode as illustrated in FIGS. 24A, 24B.

Figures 25A, 25B:
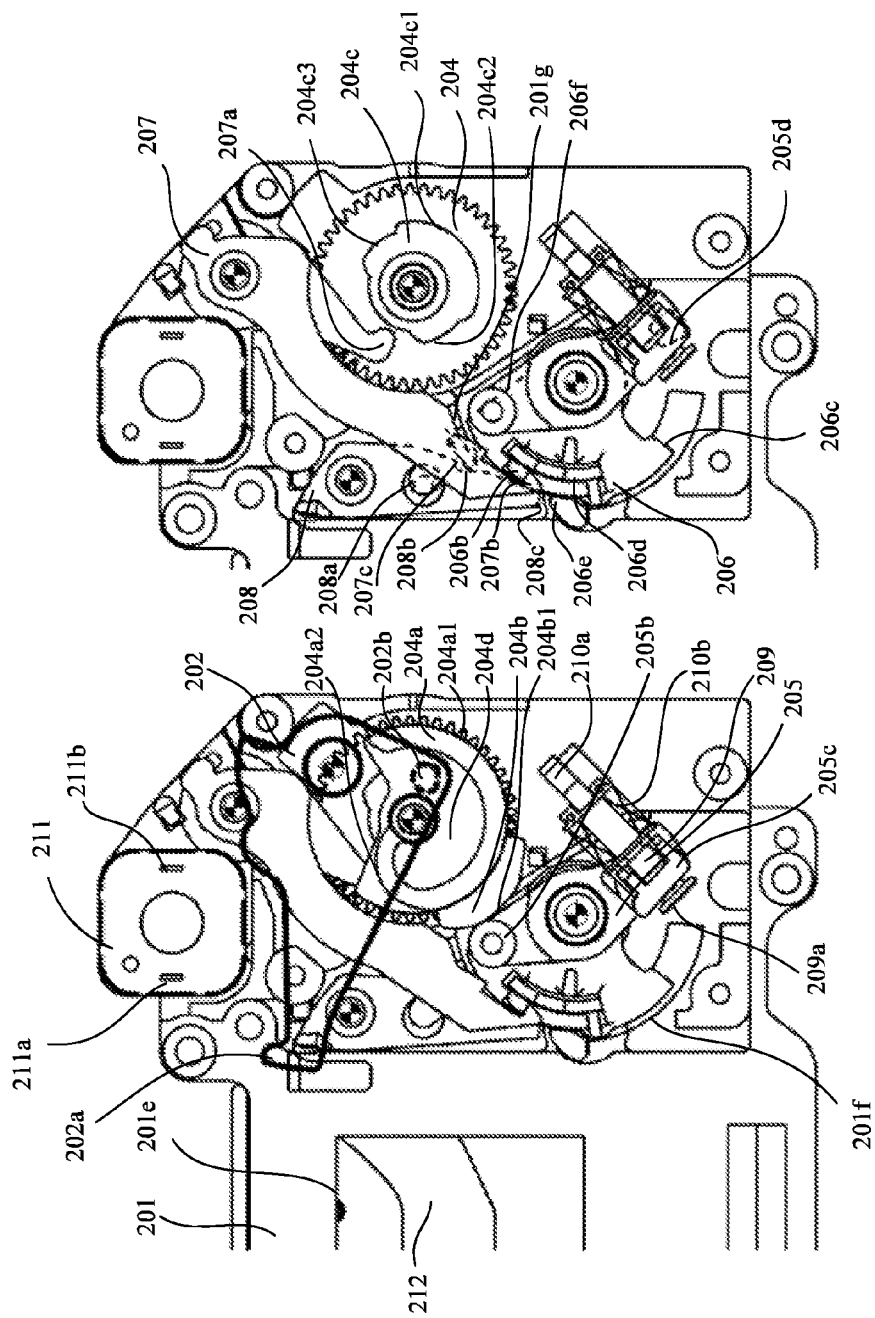
FIGS. 25A, 25B are plan views illustrating a completion state of a trailing blade charge operation in the live view shooting mode of the shutter unit.

The trailing blade charge operation is performed during the angles M-A so that the shutter unit 20 becomes a completion state of the live view charge (fourth state) as illustrated in FIGS. 25A, 25B. Then, since the locking portion 207b locks the locked portion 206b, the blade return operation of the blade lever 206 is suppressed so that the trailing blade group 212 covers the opening 201e of the shutter base plate 201. In other words, although the live view state and the completion state of the live view charge are the same phase, these open and shut states of the trailing blade group 212 are different.

Here, the applied voltage to the motor 211 during the angles I-A is explained. First, the voltage V41 is applied to the motor 211 so as to perform the normal rotation. The driving force of the motor 211 is transmitted to the cam gear 204 through the gear train 213, and the cam gear 204 performs the normal rotation. When the cam gear becomes the state of angle P, the applied voltage to the motor 211 is switched to the voltage 42. When the cam gear 204 becomes the state of the angle A, the motor 211 performs short brake so that the cam gear 204 stops during a live view charge completion phase.

The absolute values of the voltages V41, V42 satisfy the following relation.

voltage V41>voltage V42

This voltage control can decrease the overrun of the cam gear 204 at the stopping of the motor 211 than the overrun in the case that the same voltage is applied to the motor 211. In other words, since the range of the live view charge completion phase can be set smaller and the idle run time of the second frame continuous shooting operation in the live view shooting mode can be shortened, the continuous shooting speed can increase.

After a completion of the live view charge operation, the live view change over operation is performed in the case of backing the live view state without continuous shooting. The second frame continuous shooting operation in the live view shooting mode is performed in the case of continuous shooting.

[Second Frame Continuous Shooting Operation in the Live View Shooting Mode]

The armature 209 absorbs the yoke 210a by energizing to the coil 210b in the live view charge completion state (state of FIGS. 25A, 25B). When the cam gear 204 performs the reverse rotation, the angle of the cam gear 204 becomes in order from the angle A, P, O . . . K, J, I.

The state of the angle N is a readout standby state as illustrated in FIGS. 26A, 26B. In FIGS. 26A, 26B, since the roller 205b separates from the cam surface 204b1 of the trailing cam 204b, the overcharge state is released.

When the fastening release is performed, the blade return operation is performed. The trailing blade group 212 opens the opening 201e, and the light is led to the image pickup element 23. However, a high-intensity light incident to the image pickup element 23 during electric charge readout of the image pickup element 23 may generate noises such as smear on the image pickup image. Therefore, the shutter unit 20 of this embodiment waits in a standby state of readout of FIGS. 26A, 26B until completing electric charge readout of the image pickup element 23. When readout of the charge of the image pickup element 23 is completed, the cam gear 204 again performs the reverse rotation.

FIGS. 27A, 27B illustrate the state of the angle L. In FIG. 27B, when the cam follower 207a traces the fastening cam 204c, the fastening lever 207 rotates clockwise. The locking portion 207b, then, separates from the locked portion 206b.

FIGS. 28A, 28B are the state of the angle K, and illustrates the state that the blade return operation and the bound locking operation are performed.

Figures 29A, 29B:
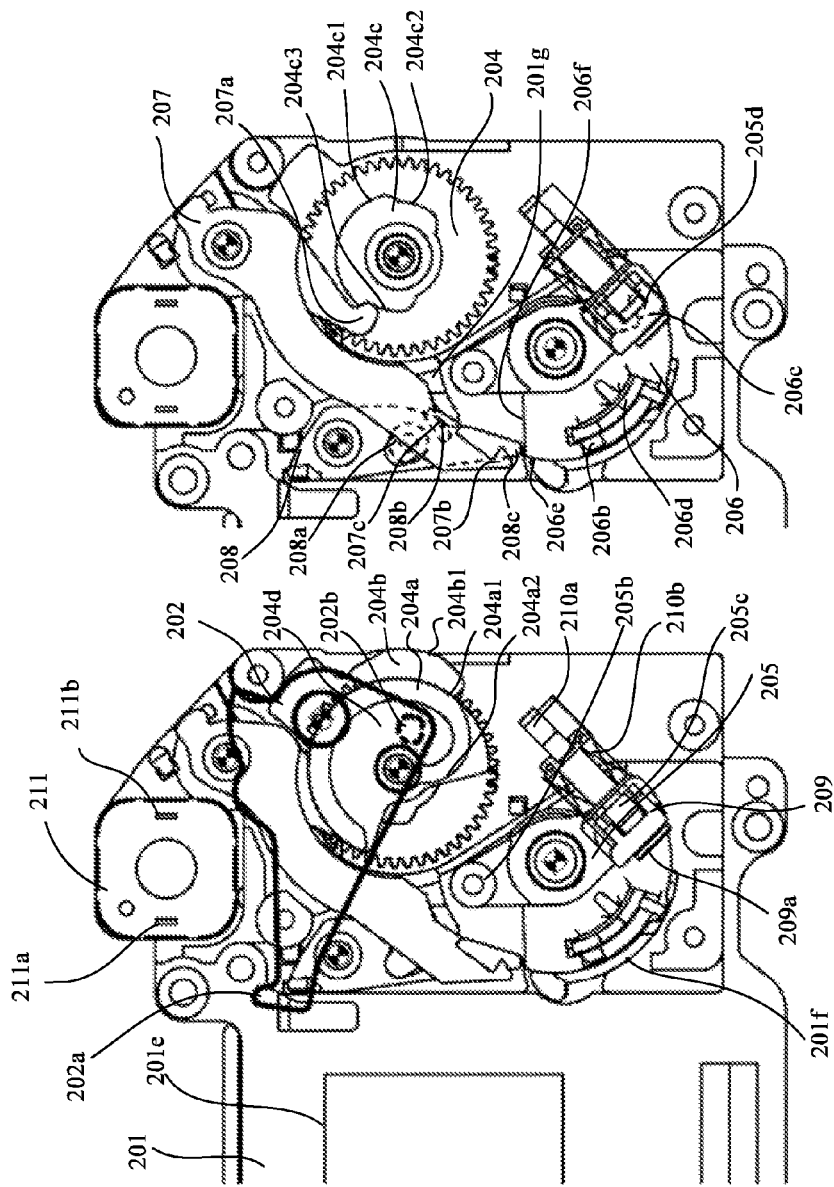
FIGS. 29A, 29B are plan views illustrating a state in which the cam gear is positioned at the terminal end of the bound locking phase in the shooting operation after second frame in continuous shooting in the live view shooting mode of the shutter unit.

FIGS. 29A, 29B illustrates the state of the angle J. In FIGS. 29A, 29B, the cam follower 207a traces the terminal of the second cam surface 204c3. In other words, the fastening lever 207 does not move from the state of FIGS. 28A, 28B (the angle K) to the state of FIGS. 29A, 29B (the angle J).

The bound locking release operation is performed during the angles J-I, and the shutter unit 20, then, becomes the standby state in the live view mode as illustrated in FIGS. 21A, 21B.

Although the start states (the live view state/the live view charge completion state) and the states in the middle of the operations in the live view image pickup operation of the first operation and the live view shooting operation after a second frame in continuous shooting are different as discussed above, the shutter unit 20 finally becomes the state of FIGS. 21A, 21B.

In the second frame continuous shooting operation in the live view shooting mode, the electrical leading blade travelling and the travelling operation are performed in the state of FIGS. 21A, 21B as the first frame shooting operation in the live view shooting mode, and the shutter unit 20 becomes the travelling completion state in the live view mode as illustrated in FIGS. 22A, 22B. The second frame continuous shooting operation in the live view shooting mode is completed by the above operations.

When the second frame continuous shooting operation in the live view shooting mode is completed, the live view charge operation is continued. If continuous shooting continues, the live view shooting operation after a second frame in continuous shooting is again performed. And, if continuous shooting does not continue, the live view change over operation is performed.

Here, the applied voltage to the motor 211 during the angles A-I is explained. First, a voltage V51 is applied to the motor 211 so as to perform the reverse rotation. The driving force of the motor 211 is transmitted to the cam gear 204 through the gear train 213, and the cam gear 204 performs the reverse rotation.

When the cam gear 204 becomes the state of the angle O, the applied voltage to the motor 211 is switched to a voltage V52.

And, when the cam gear 204 becomes the state of the angle N, the motor 211 performs short brake so that the cam gear 204 stops during a readout standby state phase (fifth phase).

The absolutes of the voltages V51, V52 satisfy the following relation.

Voltage V51>voltage V52

This voltage control can decrease the overrun of the cam gear 204 at the stopping of the motor 211 than the overrun in the case that the same voltage is applied to the motor 211. In other words, since the range of the readout standby state phase can be set smaller and the idle run time when driving at a voltage V53 as discussed below shorten, the continuous shooting speed increases.

After waiting for electric charge readout of the image pickup element 23 in the range of the readout standby phase, the voltage V53 is applied to the motor 211 so as to perform the reverse rotation.

When the cam gear 204 becomes the state of the angle K, the applied voltage to the motor 211 is switched to the voltage V54. When the cam gear 204 becomes the state the angle J, the applied voltage to the motor 211 is switched to the voltage V55. And, when the cam gear 204 becomes the state of the angle G, the motor 211 performs short brake so that the cam gear 204 stops during the live view shooting phase.

The absolutes of the voltages V53-V54 satisfy the following relation.

Voltage V53>voltage V54 and voltage V55>voltage V54

The voltage V54 is lower than the voltage V53 so as to certainly perform the bound locking operation as the normal and the silent mode. In the range applied the voltage V54 (the angles K-J, sixth phase), as illustrated in FIG. 28A-29B, the bound locking lever 208 enters into the travelling locus of the blade lever 206.

However, there is a time lag from the start of the bound by the blade return operation of the blade lever 206 at the angle L to the contact of the locked portion 206f and the locking portion 208c. Therefore, if the blade lever 206 bounds when the voltage V2 is still high, the bound locking lever 208 may evacuate. That is, since the bound locking release operation is performed before the bound locking operation completes, the bound time will extends.

A live view shooting bound locking phase as illustrated during the angles K-J may become longer so as to guarantee the bound locking operation. However, if the bound locking phase is set too long, each phase cannot be effectively allotted relative to a finite angle which is 360 degrees one rotation of the cam gear 204. In other words, when making the voltage V54 lower, 360 degrees of angles can be effectively used, and larger angles can be allowed relative to a work such as charge which needs angles.

After the bound locking operation is performed in the live view shooting bound locking phase, the motor 211 is driven by the voltage V55 higher than the voltage V54 so that the bound locking release operation is performed as early as possible. As a result, increasing of the continuous shooting speed can be achieved.

After the travelling operation, the voltage of the normal rotation direction is again applied to the motor 211, and the cam gear 204 starts the normal rotation.

As discussed above, if the shutter unit of this embodiment is used, both the finder shooting mode, which drives both the mirror and the blade group, and the live view shooting mode, which only drives the blade group in the mirror up state, are executable with one motor without using planetary gears.

About the voltage control of this embodiment, the size of the voltage itself may be changed and the effective value of voltage may be changed by generally known PWM control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-053323, filed on Mar. 15, 2013, and 2013-053688, filed on Mar. 15, 2013, which are hereby incorporated by reference herein in their entirety.

What is claimed is:

1. A shutter apparatus comprising:
a blade member configured to open and close an exposure opening;
a blade moving member configured to move between an opening position in which the blade member opens the exposure opening, and a closing position in which the blade member closes the exposure opening;
a locking member configured to move between a locking position in which the blade moving member is locked at the closing position, and a non-locking position in which the blade moving member is not locked at the closing position;
a cam member including a cam portion which abuts against the locking member so as to move the locking member from the locking position to the non-locking position; and
a restriction member configured to move between a restriction position in which a movement of the blade moving member from the opening position to the closing position is restricted, and a non-restriction position in which the movement of the blade moving member from the opening position to the closing position is not restricted,
wherein the cam member moves the locking member from the locking position to the non-locking position so that the blade moving member moves from the closing position to the opening position,
wherein the restriction member moves from the non-restriction position to the restriction position after the blade moving member moves from the closing position to the opening position, and
wherein the cam member moves the locking member in a direction opposite to a direction from the non-locking position to the locking position so that the locking member moves the restriction member from the restriction position to the non-restriction position.

2. The shutter apparatus according to claim 1, wherein the restriction member enters into a movement locus of the blade moving member after the blade moving member moves from the closing position to the opening position, and
wherein the locking member evacuates the restriction member from the movement locus of the blade moving member before the blade moving member moves from the closing position to the opening position.

3. The shutter apparatus according to claim 1, wherein the cam portion includes a first cam region and a second cam region,
wherein the locking member traces the first cam region so that the locking member moves from the locking position to the non-locking position,
wherein the locking member traces the second cam region so that the locking member, which is positioned in the non-restriction position, pushes the restriction member, and
wherein the locking member pushes the restriction member so that the restriction member moves from the restriction position to the non-restriction position.

4. An image pickup apparatus comprising:
a blade member configured to open and close an exposure opening;
a blade moving member configured to move between an opening position, in which the blade member opens the exposure opening, and a closing position, in which the blade member closes the exposure opening;
a locking member configured to move between a locking position, in which the blade moving member is locked at the closing position, and a non-locking position, in which the blade moving member is not locked at the closing position;
a cam member including a cam portion which abuts against the locking member so as to move the locking member from the locking position to the non-locking position; and
a restriction member configured to move between a restriction position, in which a moving of the blade moving member from the opening position to the closing position is restricted, and a non-restriction position, in which the movement of the blade moving member from the opening position to the closing position is not restricted,
wherein the cam member moves the locking member from the locking position to the non-locking position so that the blade moving member moves from the closing position to the opening position,
wherein the restriction member moves from the non-restriction position to the restriction position after the blade moving member moves from the closing position to the opening position, and
wherein the cam member moves the locking member in a direction opposite to a direction from the non-locking position to the locking position so that the locking member moves the restriction member from the restriction position to the non-restriction position.

5. The image pickup apparatus according to claim 4, wherein the restriction member enters into a movement locus of the blade moving member after the blade moving member moves from the closing position to the opening position, and
wherein the locking member evacuates the restriction member from the movement locus of the blade moving member before the blade moving member moves from the closing position to the opening position.

6. The image pickup apparatus according to claim 4, wherein the cam portion includes a first cam region and a second cam region,
wherein the locking member traces the first cam region so that the locking member moves from the locking position to the non-locking position,
wherein the locking member traces the second cam region so that the locking member which is positioned in the non-restriction position pushes the restriction member, and
wherein the locking member pushes the restriction member so that the restriction member moves from the restriction position to the non-restriction position.

* * * * *